United States Patent [19]
Fan et al.

[11] Patent Number: 6,072,629
[45] Date of Patent: Jun. 6, 2000

[54] POLARIZER DEVICES AND METHODS FOR MAKING THE SAME

[75] Inventors: Bunsen Fan, Peekskill; Sadeg Mustafa Faris, Pleasantville, both of N.Y.; John Charles Kralik, Lansdale, Pa.; Hemasiri Vithana, Carmel, N.Y.

[73] Assignee: Reveo, Inc., Hawthorne, N.Y.

[21] Appl. No.: 08/807,020

[22] Filed: Feb. 26, 1997

[51] Int. Cl.[7] .................................................. G02B 5/30
[52] U.S. Cl. .......................................... 359/497; 359/498
[58] Field of Search ..................................... 359/489, 494, 359/497, 498, 499, 500, 490, 495

[56] References Cited

U.S. PATENT DOCUMENTS

| | | | |
|---|---|---|---|
| 2,184,999 | 12/1939 | Land et al. ................................ | 359/498 |
| 2,403,731 | 7/1946 | MacNeille . | |
| 2,473,857 | 6/1949 | Burchell .................................... | 359/489 |
| 2,535,781 | 12/1950 | Burchell .................................... | 359/489 |
| 2,607,272 | 8/1952 | Bond ........................................ | 359/500 |
| 3,497,979 | 3/1970 | Buitkus .................................... | 359/489 |
| 4,491,326 | 1/1985 | Halsey, III ................................ | 359/489 |
| 4,525,413 | 6/1985 | Rogers et al. . | |
| 4,548,479 | 10/1985 | Yeh . | |
| 4,657,350 | 4/1987 | Mori . | |
| 4,807,981 | 2/1989 | Takizawa et al. ........................ | 359/498 |
| 4,874,664 | 10/1989 | Hamaguchi et al. . | |
| 4,902,112 | 2/1990 | Lowe ....................................... | 359/489 |
| 4,991,937 | 2/1991 | Urino . | |
| 5,122,907 | 6/1992 | Slocum . | |
| 5,245,471 | 9/1993 | Iwatsuk et al. . | |
| 5,305,143 | 4/1994 | Taga et al. . | |
| 5,506,704 | 4/1996 | Broer et al. . | |

OTHER PUBLICATIONS

U.S. application No. 08/539,279, Fan et al., filed Aug. 1995.

Young, et al., 'Optically Active Fluorite Films,' *Nature,* 183, (1959) pp. 104–105.

Dreher, 'Reflection Properties of Distorted Cholesteric Liquid Crystals,' *Solid State Communications,* vol. 12, (1973) pp. 519–522.

Dobrowolski and Lowe, 'Optical Thin Film Synthesis Program Based on the Use of Fourier Transforms,' *Applied Optics,* vol. 17, No. 19 (1978) pp. 3039–3050.

Motohiro and Taga, 'Thin Film Retardation Plate by Oblique Deposition,' *Applied Optics,* vol. 28, No. 13 (1989); pp. 2466–2481.

Lee, et al., 'Design and Construction of 1064–nm Liquid–Crystal Laser Cavity End Mirrors,' *Journal of Applied Physics,* vol. 68, (12) (1990) pp. 274–276.

Azzam, 'Chiral Thin Solid Films: Method of Deposition and Applications,' *Applied Physics Letters,* vol. 61, No. 26 (1992) pp. 3118–3120.

(List continued on next page.)

*Primary Examiner*—Ricky D. Shafer
*Attorney, Agent, or Firm*—Sampson & Associates

[57] ABSTRACT

A light polarizer includes a plurality of discrete layers of birefringent film disposed in superposed relation on a transparent substrate. The planar components of the optic axes of each successive one of the discrete layers are angularly offset relative each preceding one of the discrete layers by a predetermined angle in one or either a positive or negative direction to provide the light polarizer with selectivity for either right-handed circularly polarized (RHCP) or left-handed circularly polarized (LHCP) incident light. In another aspect of the invention, the layers are of quarter-wave thickness having planar components orthogonally offset to provide selectivity for either right or left linearly polarized light. In a still further aspect of the invention, an optically isotropic layer of quarter-wave thickness is disposed between adjacent birefringent quarter-wave plates.

35 Claims, 27 Drawing Sheets

OTHER PUBLICATIONS

Chou and Deng, 'Subwavelength Amorphous Silicon Transmission Gratings and Applications in Polarizers and Waveplates,' *Applied Physics Letters,* vol. 67, (6) (1995) pp. 742–744.

Zhang et al, 'Broadband Optical Reflector—An Application of Light Localization in One Dimension,' *Applied Physics Letters,* vol. 67, (17) (1995) pp. 2431–2432.

Hodgkinson et al, 'Scatter from Tilted–Columnar Birefringent Thin Films: Observation and Measurement of Anisotropic Scatter Distributions,' *Applied Optics,* vol. 34, No. 1 (1996) pp. 163–168.

Hodgkinson et al, 'Anisotropic Scatter Patterns and Anomalous Birefringence of Obliquely Deposited Cerium Oxide Films,' *Applied Optics,* vol. 35 No. 28 (1996) pp. 5563–5568.

J.A. Dobrowolski, Section 8, 'Coatings and Filters' in *Handbook of Optics,* W.G. Driscoll and Vaughan eds, McGraw–Hill Book Co., NY, 1978; pp. 8–1 to 8–123.

J.M. Bennett and H.E. Bennett, Section 10, 'Polarization' in *Handbook of Optics,* W.G. Driscoll and Vaughan eds, McGraw–Hill Book Co., NY, 1978; pp. 10–1 to 10–164.

Hecht and Zajac, *Optics,* (pp. 311–316) Addison–Wesley Publishing Co., Reading, MA, 1987.

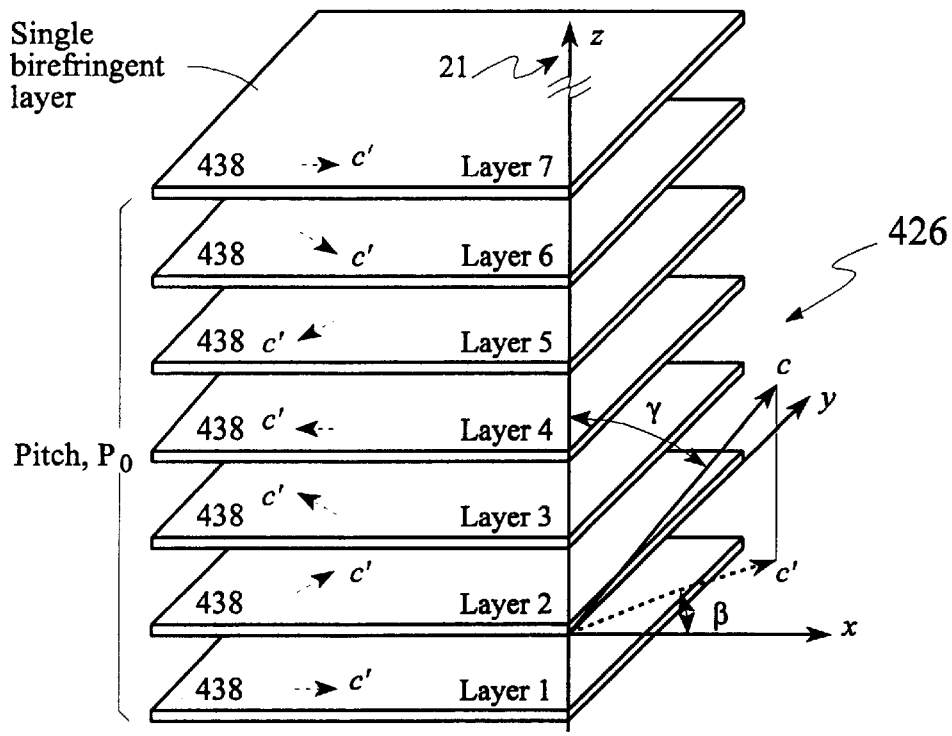
*Fig. 8A*
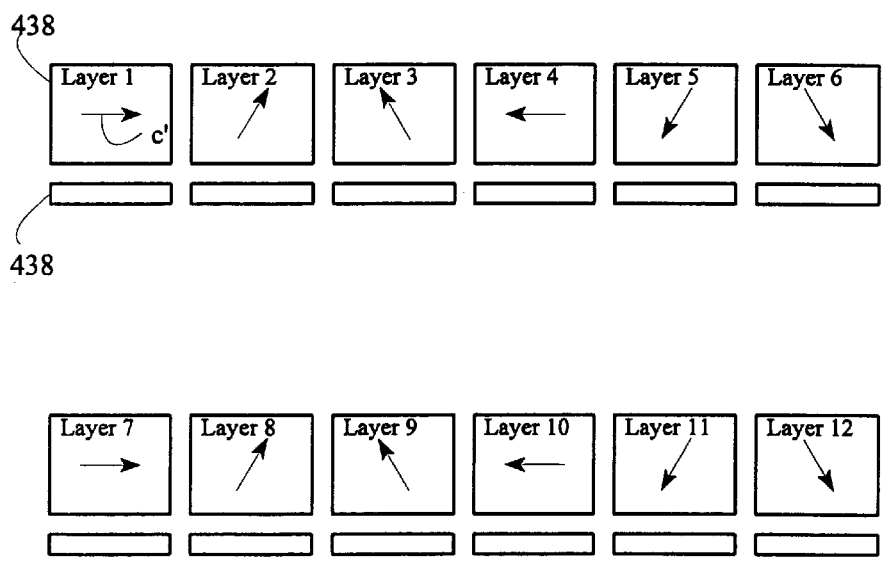
*Fig. 8A1*

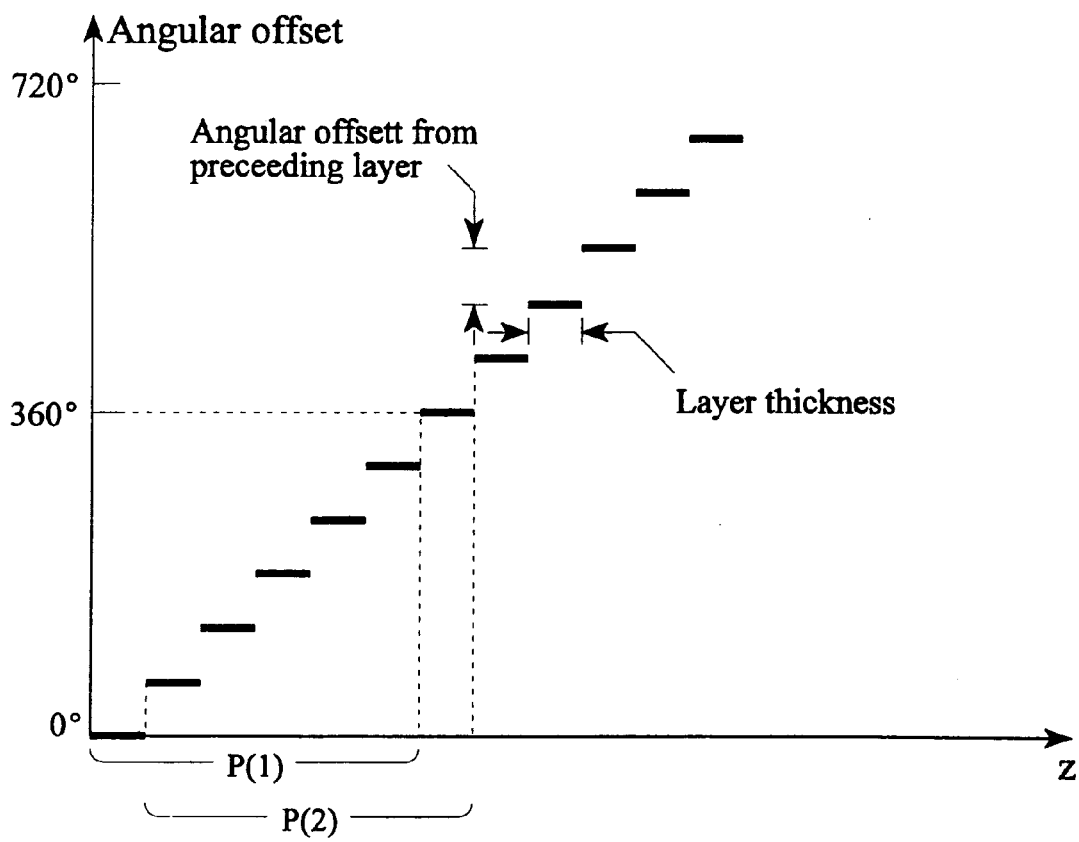
Fig. 8A2

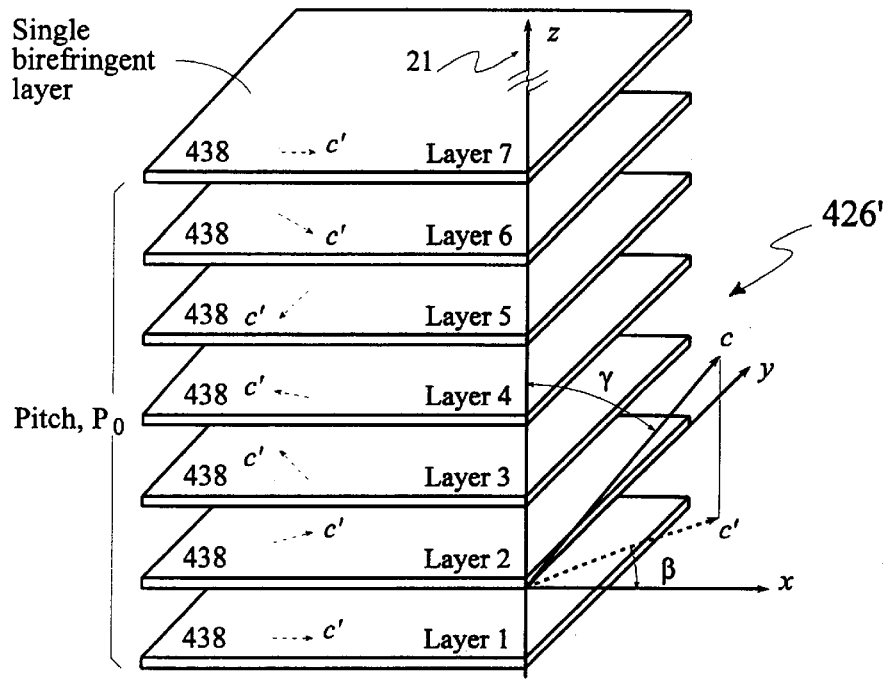
Fig. 8B
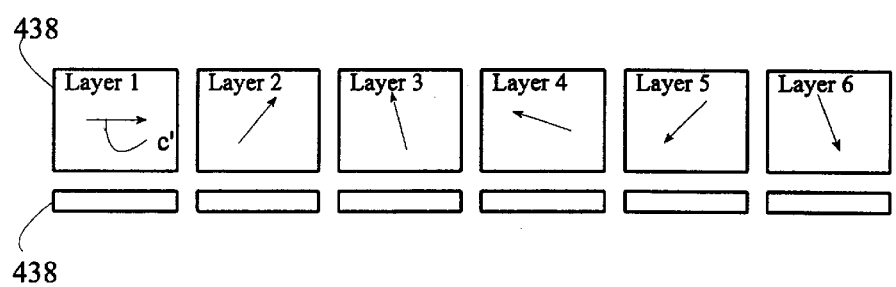
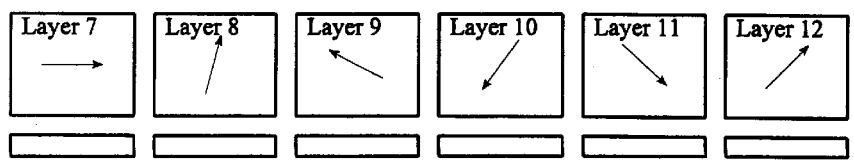
Fig. 8B1

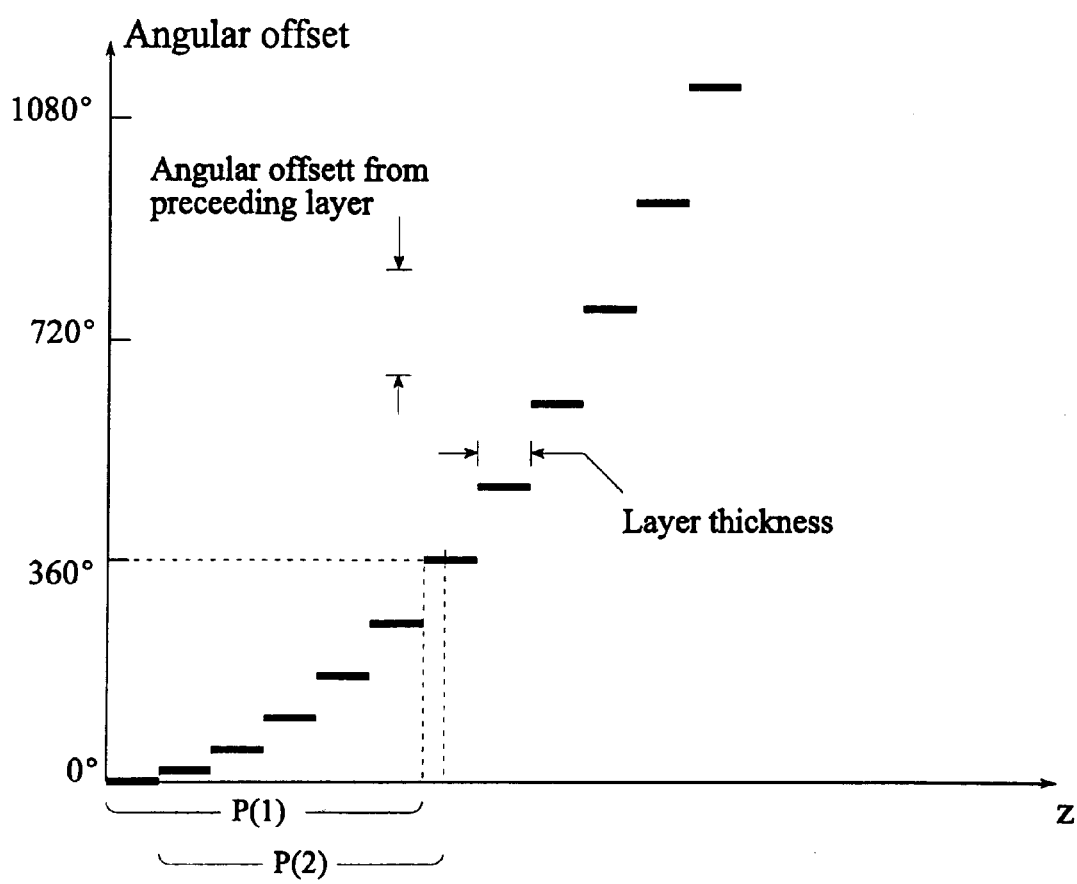
*Fig. 8B2*

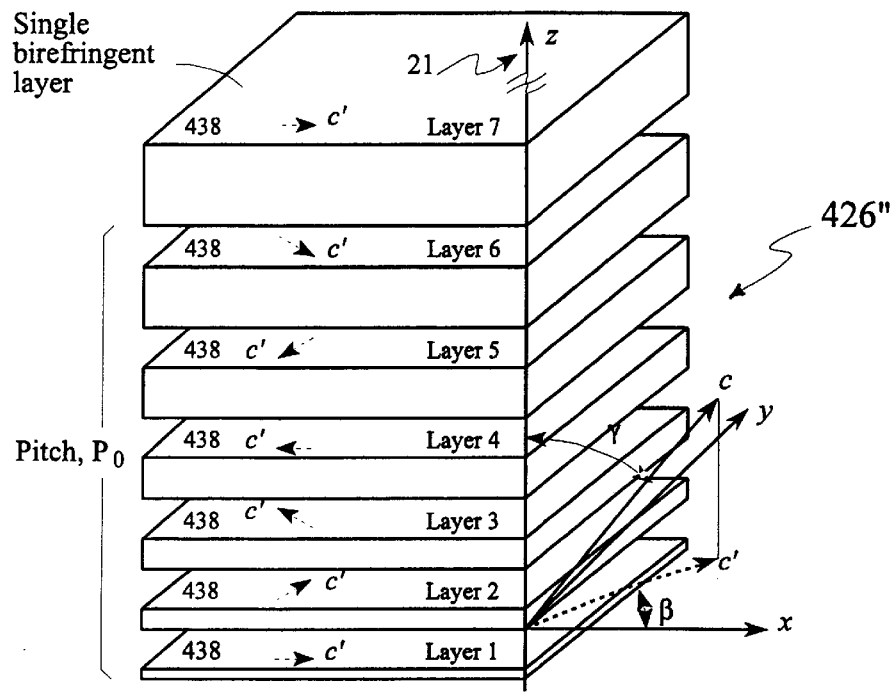
*Fig. 8C*
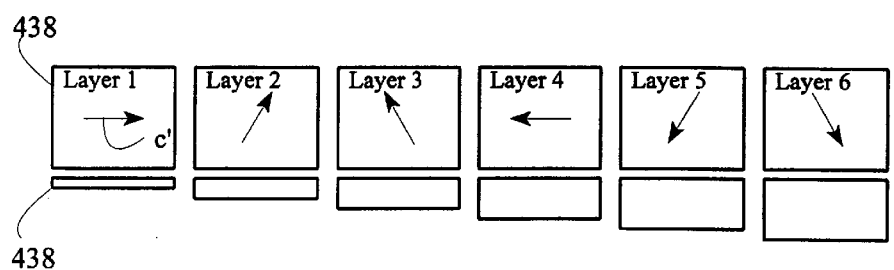
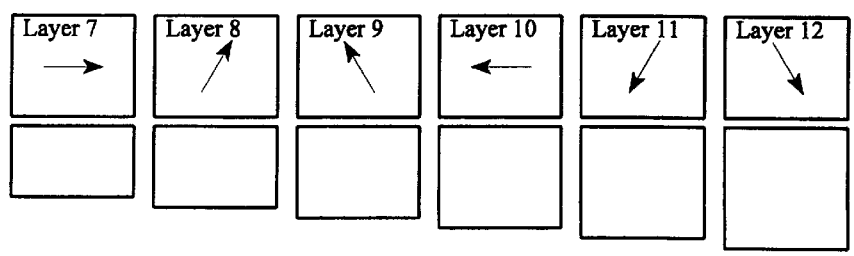
*Fig. 8C1*

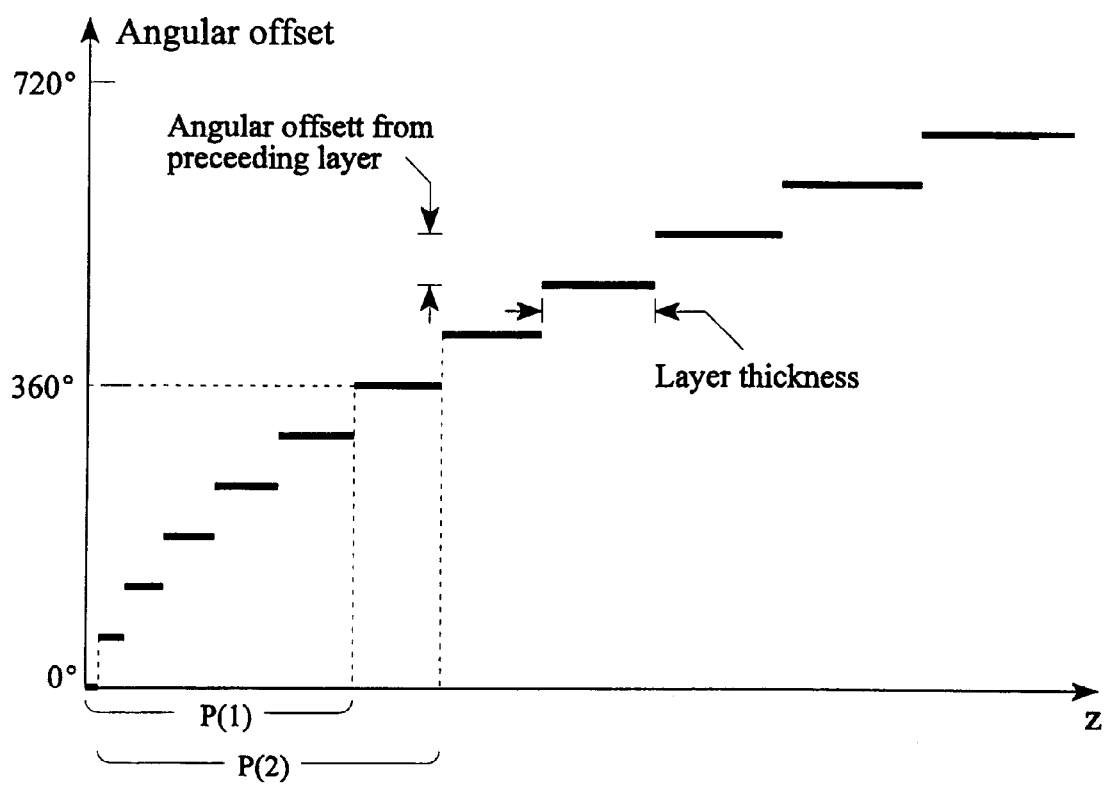
Fig. 8C2

POLARIZER DEVICES AND METHODS FOR MAKING THE SAME

BACKGROUND OF THE INVENTION

1. Field of the Invention

This invention relates to optical polarization devices, and more particularly to non-absorbing, normal-incidence, reflective polarizing optical elements employing a multi-layer stack of optically birefringent thin film layers obtainable by oblique vapor deposition in vacuum.

2. Background Information

The prior art includes several well-known light polarizing components. For example, prism polarizers, commonly known as Nicol and Glan polarizers, are based on double refraction of birefringent crystals—usually calcite. These components utilize polarization-selective total internal reflection at the interfaces of two matched prisms made of birefringent crystals. With these polarizers, one of the linearly polarized light components of incident light is removed by total internal reflection, while the orthogonal component is transmitted. These prism polarizers offer an extinction ratio of higher than 100,000 and can cover a relatively wide spectral range. For example, calcite polarizers nominally have a useful spectral range of 0.35–2.3 μm. However, these crystal polarizers are limited in size by the scarcity of calcite of good optical quality. In addition, they tend to be expensive, bulky and extremely sensitive to angle of incidence.

A variation of the Glan type polarizer is the cube polarizer disclosed in U.S. Pat. No. 2,403,731 issued to MacNeille. This polarizer consists of two glass prisms cemented together along their hypotenuses. The diagonal face of one of the prisms is coated with a multilayer dielectric film stack designed to reflect one linear polarization component and transmit the orthogonal component. Although much less costly than crystalline prism polarizers, MacNeille cubes typically exhibit a lower extinction ratio of about 1,000 and can operate over a wavelength band of only about 300 nm.

Additional significant prior art includes dichroic polarizers, such as those commonly referred to as "Polaroid®" sheet polarizers. These polarizers are based on polarization-selective absorption, or dichroism, which was first discovered by Biot circa 1815. Modern sheet polarizers are based on an invention by Edwin Land circa 1928. This technology is reviewed by the inventor in *Journal of Optical Society America*, 41, 957(1951). These widely used sheet polarizers can typically provide an extinction ratio of 1,000 and are of low cost. High extinction ratio is possible but is achieved at expense of transmittance efficiency. Because they are constructed of organic polymers, they possess severe inherent limitations, i.e. they are limited to low optical power handling capability, limited to use at low operating temperature and restricted to use in the visible spectral range.

Another example of a dichroic polarizer recently introduced by Corning Glass Works of Corning N.Y., is sold under the trademark Polarcor™. This polarizer is made of glass which contains elongated submicroscopic silver particles aligned in the same direction. The silver particles preferentially absorb light polarized along the long axis of the silver particles while transmitting light of the orthogonal polarization. These glass-based filters are durable and may typically withstand a temperature up to 400° C.; however, they exhibit relatively narrow bandwidth and are limited in operating wavelength range from approximately 0.633 to 2.1 μm.

A further example of a dichroic filter includes a metal film obliquely deposited on a glass substrate as disclosed in U.S. Pat. No. 5,122,907 (hereinafter, the '907 patent) issued to Slocum. This dichroic film is made up of microscopic prolate metal spheroids all aligned in the same direction on the glass surface. A polarizer of this general type, commercially available from Melles Groit Company of Irvine, Calif., for example, operates in the near-infrared spectral range and has relatively low transmittance of only about 20%.

Other important prior art includes polarizers based on organic cholesteric liquid crystalline (CLC) materials. This art has been taught, for example, by Lee and Jacobs, in a paper published in *Journal of Applied Physics*, Vol. 68, No. 274 (1990). Cholesteric liquid crystalline thin films, with molecular alignment in the so-called planar texture, exhibit wavelength- and circular polarization-selective reflectance over a spectral range which is material dependent. Such films may operate satisfactorily as circular polarizers in many applications, but because they are organic materials, they absorb strongly in the UV spectral range, limiting their operating range. Moreover, their operating temperature is limited to about 140° C. These films may be used as a transmissive linear polarizers in conjunction with a quarter-wave plate which converts the polarization of transmitted light from circular to linear.

Recently, Iwatsuka et al disclosed polarizing devices based on diffraction grating based on obliquely deposited thin film in U.S. Pat. No. 5,245,471. One of the limitations of such devices is that the 0-th diffracted light beam remains unpolarized.

Thus, a need exists for an improved polarizing optics method and apparatus for polarizing light in a manner which achieves a substantial improvement in efficiency and power handling capability.

SUMMARY OF THE INVENTION

According to an embodiment of this invention, a light polarizer includes a substrate and a plurality of discrete layers of birefringent film disposed on the substrate in superposed relation to one another. Each one of the discrete layers is substantially planar and defines a planar direction. Each one of the discrete layers has an optic axis and a planar component thereof extending in the planar direction. The planar component of at least one of the plurality of discrete layers is angularly offset from the planar component of an other of the plurality of discrete layers.

As an enhancement, the planar component of each successive one of the discrete layers is angularly offset relative each preceding one of the discrete layers by an oblique, acute angle in one of either a positive or negative direction to provide the light polarizer with either a right-handed chirality or a left-handed chirality for circularly polarizing incident light.

The present invention provides, in a second aspect, a light polarizer including a substrate and a plurality of birefringent layers superposed over one another on the substrate. Each one of the birefringent layers has a quarter-wave thickness $t=\lambda_0/4$, where $\lambda_0$ is a characteristic wavelength of the light polarizer. Each one of the birefringent layers is substantially planar, defining a planar direction, and has an optic axis and a planar component thereof extending in the planar direction. An optically isotropic layer of quarter-wave thickness is located between adjacent birefringent layers.

As an enhancement, at least one of the birefringent layers is a composite layer of superimposed sublayers. Each one of the superimposed sublayers has a sublayar planar component of a sublayer optic axis. The sublayer planar components of each one of the superimposed sublayers extend substantially parallel to one another in the planar direction.

A still further aspect of the present invention includes a method of fabricating a polarizer including the steps of providing a substrate and depositing a plurality of layers of birefringent film on the substrate in superposed relation to one another, each one of the plurality of discrete layers being substantially planar and defining a planar direction. Each one of the plurality of layers are deposited from an oblique deposition angle relative the planar direction, to provide each one of the layers with an optic axis having a planar component thereof extending in the planar direction. The deposition angle of at least one of the layers is angularly offset in the planar direction from the deposition angle of an other of the layers to angularly offset the planar component of at least one of the layers from the planar component of an other of the layers.

In yet another aspect of the present invention, a method of fabricating a light polarizer includes the steps of providing a substrate and depositing a plurality of birefringent layers superposed over one another on the substrate, each one of the plurality of birefringent layers being substantially planar and defining a planar direction. Each one of the birefringent layers is provided with a quarter-wave thickness $t=\lambda_0/4$, where $\lambda_0$ is a characteristic wavelength of the light polarizer. Each birefringent layer is deposited from an oblique deposition angle relative the planar direction, so that each birefringent layer is provided with an optic axis having a planar component thereof extending in the planar direction. An optically isotropic layer of quarter-wave thickness is deposited between adjacent birefringent layers.

The present invention thus advantageously utilizes birefringent thin film stacks to nominally completely reflect, rather than absorb, normally-incident light polarized in one orientation to provide a polarizer capable of operating at relatively high light intensities and temperatures.

The above and other features and advantages of this invention will be more readily apparent from a reading of the following detailed description of various aspects of the invention taken in conjunction with the accompanying drawings.

BRIEF DESCRIPTION OF THE DRAWINGS

FIG. 8A is an exploded, schematic perspective view of a representative portion of a preferred embodiment of a circular polarizer of constant pitch distribution, in accordance with the present invention;

FIG. 8A1 is a series of schematic plan and side elevational views of layers of a circular polarizer portion of the type shown in FIG. 8A;

FIG. 8A2 is a graphical representation of angular offset and layer thickness for the layers of the circular polarizer portion shown in FIG. 8A1;

FIG. 8B is a view similar to that of FIG. 8A, of a representative portion of a preferred embodiment of a circular polarizer of gradient pitch distribution, in accordance with the present invention;

FIG. 8B1 is a series of schematic plan and side elevational views of layers of a circular polarizer portion of the type shown in FIG 8B;

FIG. 8B2 is a graphical representation of angular offset and layer thickness for the layers of the circular polarizer portion shown in FIG. 8B1;

FIG. 8C is a view similar to that of FIG. 8A, of a representative portion of a further embodiment of a circular polarizer of gradient pitch distribution, in accordance with the present invention;

FIG. 8C1 is a series of schematic plan and side elevational views of layers of a circular polarizer portion of the type shown in FIG. 8C;

FIG. 8C2 is a graphical representation of angular offset and layer thickness for the layers of the circular polarizer portion shown in FIG. 8C1;

DETAILED DESCRIPTION OF THE PREFERRED EMBODIMENTS

Figure 1A:
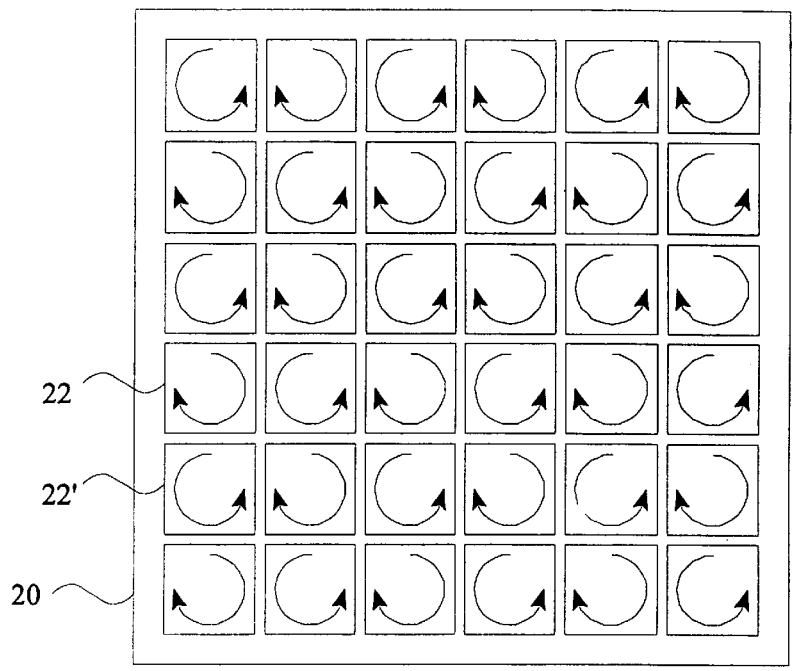
FIG. 1A is a schematic plan view of a polarizer array incorporating a plurality of circular polarizers of the present invention.

For clarity of exposition, like features shown in the accompanying Drawings shall be indicated with like reference numerals and similar features such as shown in alternate embodiments shall be indicated with similar reference numerals.

Briefly described, the present invention includes birefringent thin film stacks that utilize properties of optical interference to reflect, rather than absorb, normally incident light of a particular polarization orientation. As shown, a light polarizer 426 (FIG. 8A) includes a plurality of discrete layers 438 of birefringent film disposed in superposed relation on a substrate. The planar components c' of the optic axes c of each successive one of the discrete layers are angularly offset relative each preceding one of the discrete layers by a predetermined angle $\beta$ in one of either a positive or negative direction to provide the light polarizer with selectivity for either right-handed circularly polarized (RHCP) or left-handed circularly polarized (LHCP) incident light. In another embodiment of the invention, a polarizer 226 (FIG. 5A) includes birefringent layers 230 and 32 of quarter-wave thickness, each having optic axes c orthogonally offset in the planar direction to provide selectivity for either of two orthogonal linearly polarized light components. For convenience, the two orthogonal components are chosen along the x- and y-axes as shown herein and are referred to hereinafter as x-polarized and y-polarized light, respectively. In a still further aspect of the invention, a polarizer 26 (FIG. 2A) includes an optically isotropic layer 34 of quarter-wave thickness disposed between adjacent birefringent quarter-wave layers.

Where used in this disclosure, the term 'polarizer' shall refer to any stack of superposed birefringent layers, as taught herein, capable of exhibiting polarization-selective and/or wavelength-selective reflectance, regardless of the number of layers thereof. The term 'thickness' when used herein in reference to a layer or any portion thereof, shall refer to the optical thickness, as defined by physical thickness divided by the refractive index thereof. The term 'isotropic' shall mean that the refractive index of a material is independent of the polarization direction of light. Similarly, the term 'anisotropic' shall mean that the refractive index of a material is polarization direction-dependent. The terms 'homogeneous' and 'inhomogeneous' mean that the refractive index of a particular layer is, respectively, position-independent and position-dependent. For convenience, inhomogeneous layers are assumed to be stratified, meaning that the optical properties thereof are constant throughout each plane perpendicular to a fixed direction defined by the z-axis of the Cartesian coordinate system 21 shown in the drawings. Thus, the refractive index n of an inhomogeneous layer has a functional dependence, n(z), which may depend on the polarization direction of light traveling therethrough. The refractive index for these two components is different. Any reference in this disclosure to an x-, y- or z-axis or direction shall refer to directions relative to Cartesian coordinate system 21 as shown in the Drawings. Moreover, the terms 'planar direction' and 'planar component' shall refer to a direction, for example, of an optic axis, in the xy-plane of the Cartesian coordinate system 21.

Figure 1B:
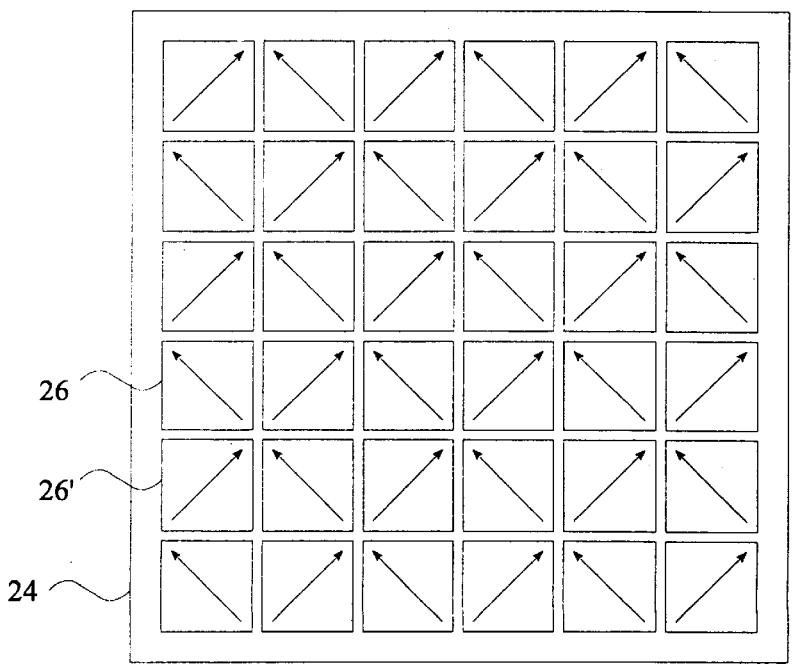
FIG. 1B is a schematic plan view of a polarizer array incorporating a plurality of linear polarizers of the present invention.

Referring to FIG. 1A, a circular polarizer array 20 may be fabricated utilizing circular polarizers 22 and 22' of the present invention arranged in a crossed or alternating pattern. Referring to FIG. 1B, a linear polarizer array 24 may be similarly fabricated utilizing crossed linear polarizers 26 and 26' of the present invention. As shown, polarizers 22' and 26' are similar, but orthogonally polarized examples of polarizers 22 and 26 respectively. The term 'orthogonal' when used herein to describe polarization directions, shall be used in its traditional vector geometrical sense, in which 'orthogonal vectors' are those whose dot products are zero. As such, orthogonal vectors may be either a pair of perpendicular straight vectors, or alternatively, a pair of complex vectors, such as those representing circular polarization. Accordingly, for simplicity, throughout this disclosure, polarizers of only one articular orientation may be described with the understanding that such descriptions will also apply to polarizers of orthogonal orientations.

Figure 2A:
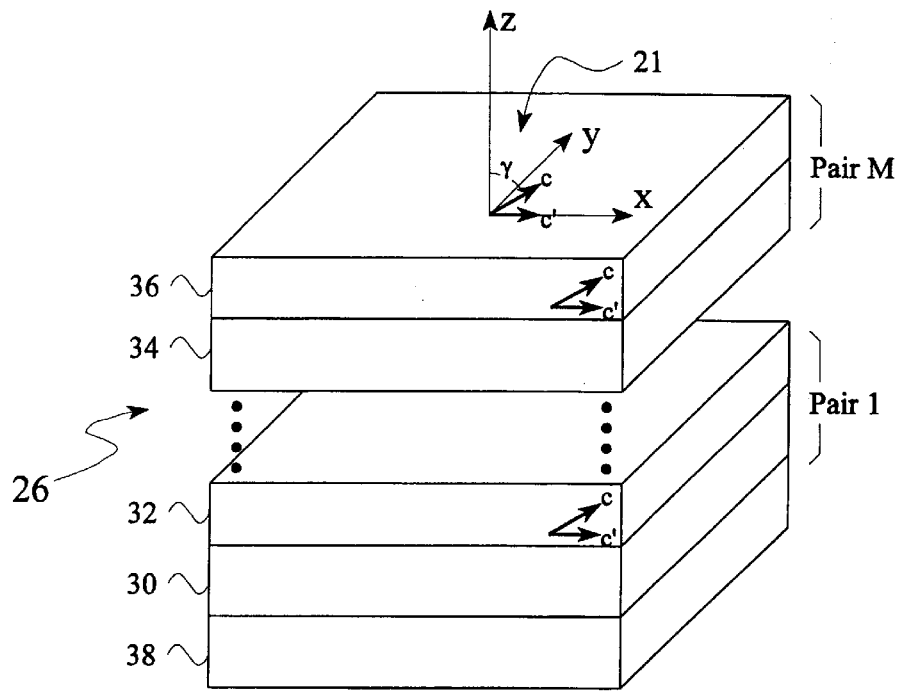
FIG. 2A is a schematic perspective view of a representative portion of a preferred embodiment of a linear polarizer in accordance with the present invention.

As shown in FIG. 2A, linear polarizer 26 includes a stack of thin film layers 30, 32, . . . , 34 and 36 on a substrate 38.

The substrate is either optically isotropic or anisotropic. Each layer 30, 32, ..., 34 and 36 is alternately optically isotropic and anisotropic. Each layer may be either homogeneous or inhomogeneous. For light normally incident, that is, traveling in the -z-direction, e.g. from the air, polarizer 26 has two effective refractive indices, $n_x(z)$ and $n_y(z)$, for light polarized along x- and y-axes, respectively.

Those skilled in the art will recognize that light normally incident on a film stack such as polarizer 26 may effectively include two orthogonal polarization components, one extending along the x-axis and the other along y-axis. Thus, optical reflectance or transmittance of the incident light can be analyzed with respect to these components. Optical reflectance and transmittance properties of a multilayer stack of films are well known in the art. Typical multilayer coatings are either used to enhance reflectance, a so-called high-reflector coating, or to reduce reflectance, a so-called anti-reflection coating.

Turning back to FIG. 2A, the reflective polarizing thin film coating consists of a plurality of preferably homogeneous layers that are alternately isotropic and birefringent. As shown, layers 30 and 32 form a pair of isotropic and birefringent layers, respectively, (Pair 1) and layers 34 and 36 form another similar pair, (Pair M). For simplicity of illustration, layers 30 and 34 are optically isotropic, fabricated from the same material referred herein as material B (which will be discussed in greater detail hereinafter) and having a refractive index $n_B$. However, layers 30 and 34 may be fabricated from nominally any material providing dissimilar indices of refraction to layers 32 and 36, as will become apparent hereinafter. Layers 32 and 36 are optically birefringent, each having an optic axis c in the xz-plane, disposed at a predetermined angle $\gamma$ to the incident direction or z-axis. Thus, as shown, a planar component c' of each optic axis c is also in the xz-plane. Formation of optic axis c and values for angle $\gamma$ for the embodiments of the present invention will be discussed hereinafter with respect to FIG. 12A. Layers 32 and 36 are preferably fabricated from the same material A (also to be discussed hereinafter) and have refractive indices denoted by $n_{Ax}$ and $n_{Ay}$ for light polarized in the x- and y-directions, respectively. Typically, $n_{Ax} > n_{Ay}$ as will become clear hereinafter to those skilled in the art. Layers 30, 32, ..., 34 and 36 are of quarter-wave thickness, that is, $n_{Ax}t_A = n_B t_B = \lambda_0/4$, where t denotes the layer thickness, subscripts A and B indicate the layer material and $\lambda_0$ is the characteristic wavelength or center wavelength of the reflectance or transmittance band of the polarizer. In this regard, reflectance and transmittance (assuming negligible losses) are generally equal but opposite measurable characteristics of a polarizer. The relation between the reflectance $R(\lambda)$ and transmittance $T(\lambda)$ is given by $$R(\lambda) + T(\lambda) = 100\%$$

Thus, the terms reflectance and transmittance, when utilized herein in conjunction with a polarizer of the present invention, are interchangeable. Moreover, where succeeding pairs of layers, such as pair M, are substantially identical to a first pair, such as pair 1, throughout the remainder of this disclosure, only one pair may be discussed with the understanding that such discussion will be representative of all similar pairs of layers.

Optically isotropic film layer 30 is preferably deposited on substrate 38 at normal incidence to the substrate in a conventional manner. Alternatively, the isotropic layer may be obtained by deposition at an oblique angle with the substrate rotating, as in a manner to be discussed hereinafter, so that the resulting film is optically isotropic. The thickness $t_B$ of layer 30 is such that $n_B t_B = \lambda_0/4$. In contrast, optically birefringent film layer 32 is deposited onto the layer 30 at a deposition angle $\theta$ (FIG. 12A) predetermined to provide layer 30 with optic axis c oriented at predetermined angle $\gamma$ as mentioned hereinabove and as will be discussed hereinafter with respect to FIG. 12A.

Film layer 32 thus exhibits an optical birefringence $\Delta n_A$, wherein $\Delta n_A = n_{Ax} - n_{Ay}$ for light incident normal to the substrate, where $n_{Ax}$ is the index of refraction for x-polarized light and $n_{Ay}$ is the index of refraction for y-polarized light incident on layer 32. The thickness $t_A$ of layer 32 is such that $n_{Ax}t_A = \lambda_0/4$. To promote efficiency of polarizer 26, the refractive index in the y direction, $n_{Ay}$, of layer 32 closely matches the refractive index of layer 30, i.e., $n_{Ay} = n_B$. Thus, using terminology common in the art, $n_{Ax} = n_H$ and $n_{Ay} = n_L$. This deposition procedure is then repeated until a predetermined number, M, of birefringent-isotropic pairs have been disposed in a stacked or superimposed manner onto substrate 38. The resulting structure exhibits strong reflection over a spectral band centered at wavelength $\lambda_0$ for x-polarized light and exhibits high transmittance for y-polarized light. Polarizer 26 thus rejects light polarized in one plane of polarization by reflection, rather than by absorption. This aspect enables the polarizer of the present invention to be inherently capable of withstanding higher incident intensities than conventional dichroic polarizers.

Figure 2B:
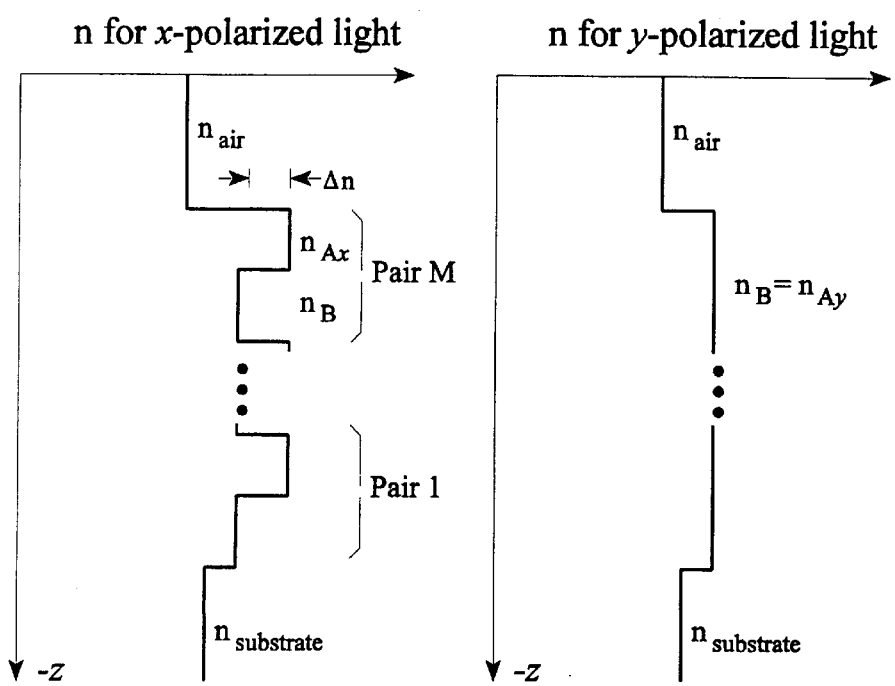
FIG. 2B is a graphical representation of the refractive indices of the linear polarizer of FIG. 2A, for x- and y-polarized light.

Referring now to FIG. 2B, for light polarized along the x-axis, the refractive index profile is a periodic function in z: $n_{air}(n_H n_L)^M n_{substrate}$, where $n_H = n_{Ax}$, $n_L = n_B = n_{Ay}$ and M is the number of pairs 1. The refractive indices of air and substrate are denoted by, respectively, $n_{air}$ and $n_{substrate}$.

The polarizing performance of a thin film stack can be calculated using transfer matrix or characteristic matrix techniques commonly used in multilayer film theory, for example, given in E. Hecht and A. Zajac, *Optics*, Addison-Wesley Publishing Co., Reading, Mass., 1974 (pages 311–316) the cited pages of which are hereby incorporated by reference in their entireties, herein.

A polarizer of the present invention, such as polarizer 26, may be generally characterized as a type $a(HL)^M s$ structure, where s denotes a substrate, a air and HL for alternating quarter-wave layers with high and low refractive indices, respectively. The number of HL layers pairs is M. Where incident light is normal to the substrate surface, a maximum reflectance at $\lambda_0$ for light polarized in the xz-plane is:

$$R^{max}_{x-polarized\ light} \left[ \frac{1/n_{sg} - (n_{Ay}/n_{Ax})^{2M}}{1/n_s + (n_{Ay}/n_{Ax})^{2M}} \right]^2, \quad (1a)$$

and the maximum reflectance for light polarized in the yz-plane is:

$$R^{max}_{y-polarized\ light} \left[ \frac{1/n_s - 1}{1/n_s + 1} \right]^2. \quad (1b)$$

Figure 4A:
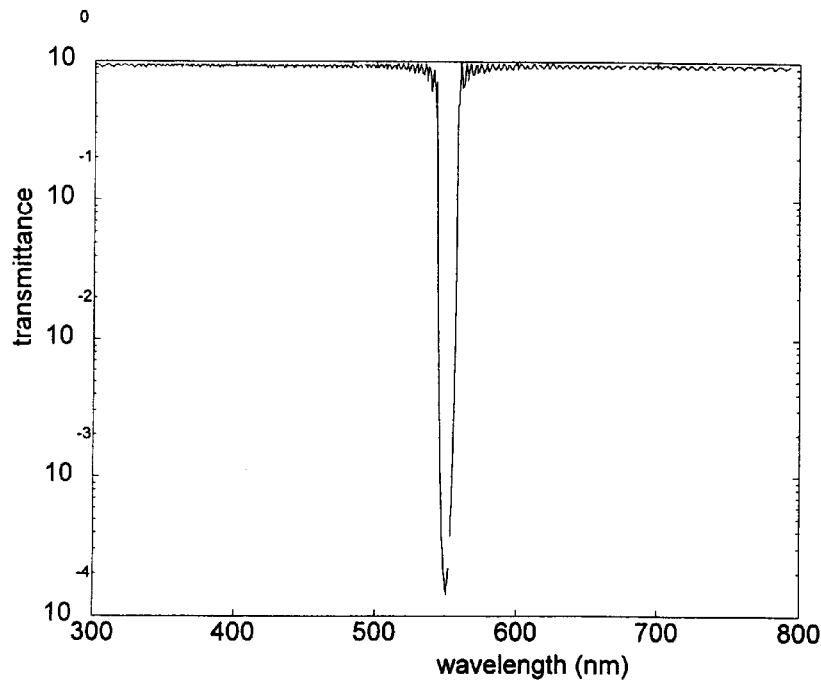
FIG. 4A is a graphical representation of a transmission spectrum for light polarized in the plane containing the optic axes of the birefringent layers shown in FIGS. 2A and 3A.
Figure 4B:
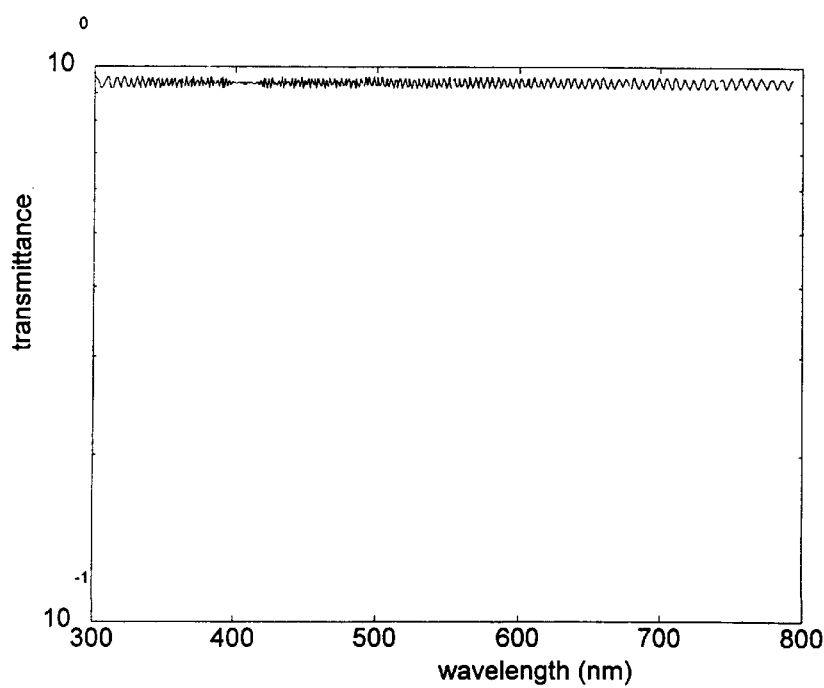
FIG. 4B is a graphical representation of a transmission spectrum for light polarized in a plane perpendicular to the plane containing the optic axes of the birefringent layers shown in FIGS. 2A and 3A.

Attention is thus directed to FIGS. 4A and 4B which show transmittance spectra for a representative example of a multilayer polarizer 26 fabricated as discussed hereinabove. In this example, birefringent layers 32 and 36 have refractive indices of $n_H = 1.72$ and $n_L = 1.66$, the isotropic layers 30 and 34 have a refractive index $n_L = 1.66$ and M=150. The substrate material is conventional soda lime glass ($n_s = 1.52$) and the designed characteristic wavelength or center wavelength $\lambda_0$ of the reflectance band is 550 nanometers, $\lambda_0 = 550$ nm. Incident light was normal to the substrate surface. Maximum reflectances in the xz- and yz-planes calculated using formulas (1a) and (1b) hereinabove yield an extinction ratio, defined as transmittance ratio of x-polarized to y-polarized light, of nearly 10,000. This ratio is better than that typically achieved using MacNeille or dichroic polarizers. The bandpass spectral width is approximately 10 nanometers.

It is expected that a larger birefringence $\Delta n$ for the birefringent A-layers will result in a larger polarizing bandwidth. In this regard, the reflectance bandwidth is given by the following equation (1c) that appears in subsection 43, Section 8 *Filters and Coatings Based on Interferences in Thin Films* by J. A. Dobrowolski, in *Handbook of Optics*, W. G. Driscoll and W. Vaughan, ed., McGraw-Hill Book Company, New York 1978, (hereinafter *Filters and Coatings*) which subsection is hereby incorporated by reference in its entirety herein. The reflectance bandwidth is given by:

$$\Delta\lambda/\lambda = (4/\pi)\sin^{-1}[(1-n_H/n_L)/(1+n_H/n_L)]. \quad (1c)$$

Larger $n_H/n_L$ (or birefringence $\Delta n = n_H - n_L$) results in a larger $\Delta\lambda/\lambda$ (or bandwidth $\Delta\lambda$ centered at $\lambda$). This is a consequence of optical interferences from a periodic structure as shown for x-polarized light in FIG. 2B.

Thus, as shown by the above example, the use of a multilayer coating having alternating birefringent and isotropic layers as taught by the subject invention effectively utilizes the optical characteristics of birefringent layers. For the x-polarized light, polarizer 26 is a high-reflector, utilizing the optical interference effects of the stacked layers. For y-polarized light, the film stack is isotropic and thus, a high-transmitter. This reflectance difference for the two orthogonally polarized components is utilized as a polarizing element. While this example employs 150 thin-film pairs, this number may be significantly reduced by utilizing materials with higher birefringence. Polarizers fabricated with such layers of relatively higher birefringence will have transmittance and reflectance bands of greater bandwidth, for the reasons discussed hereinabove with respect to equation (1c).

Relatively higher birefringence also tends to provide higher extinction ratios as shown by the example described in conjunction with equation (1a), hereinabove, In this regard, referring back to the example discussed hereinabove in conjunction with FIGS. 4A and 4B, for a highest extinction ratio, $R_{x-polarized\ light}$ should approach unity. If $n_{Ax}$ is much larger than $n_{Ay}$ (i.e., larger birefringence), the term $(n_{Ay}/n_{Ax})^{2M}$ is smaller for a given M (number of paired layers), wherein $R_{x-polarized\ light}$ is closer to unity. Numerical examples are shown in the following table:

|  | $(n_{Av}/n_{Ax})^{2M}$ | $(n_{Av}/n_{Ax})^{2M}$ | $(n_{Av}/n_{Ax})^{2M}$ |
| --- | --- | --- | --- |
| M = 5 | $(0.9)^{10} = 0.34868$ | $(0.8)^{10} = 0.10737$ | $(0.7)^{10} = 0.02825$ |
| 10 | $(0.9)^{20} = 0.12158$ | $(0.8)^{20} = 0.01153$ | $(0.7)^{20} = 0.00080$ |
| 15 | $(0.9)^{30} = 0.04239$ | $(0.8)^{30} = 0.00124$ | $(0.7)^{30} = 0.00002$ |

Figure 3A:
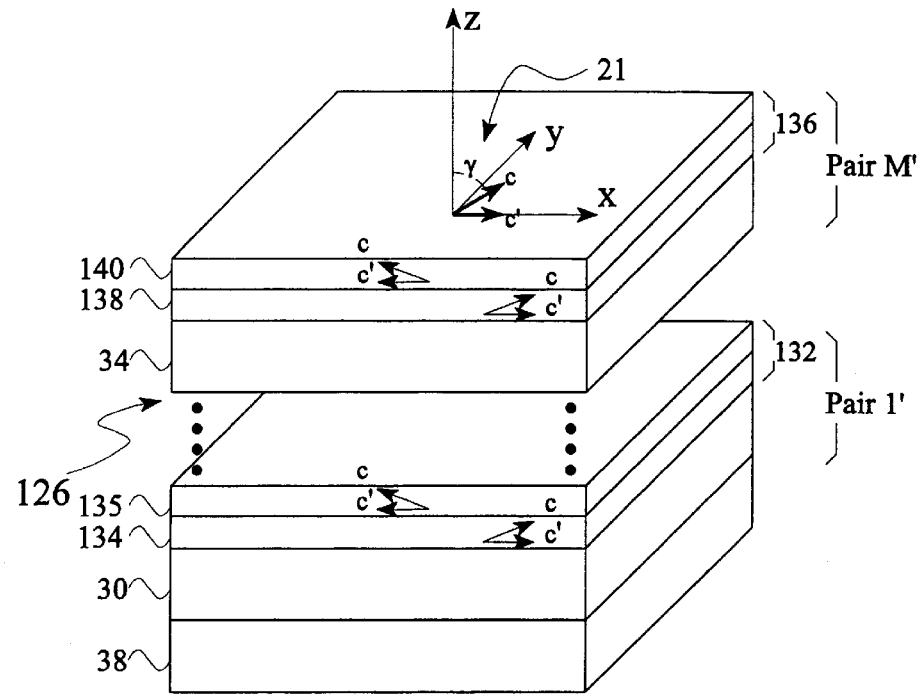
FIG. 3A is a view similar to that of FIG. 2A, of another preferred embodiment of a linear polarizer in accordance with the present invention.
Figure 3B:
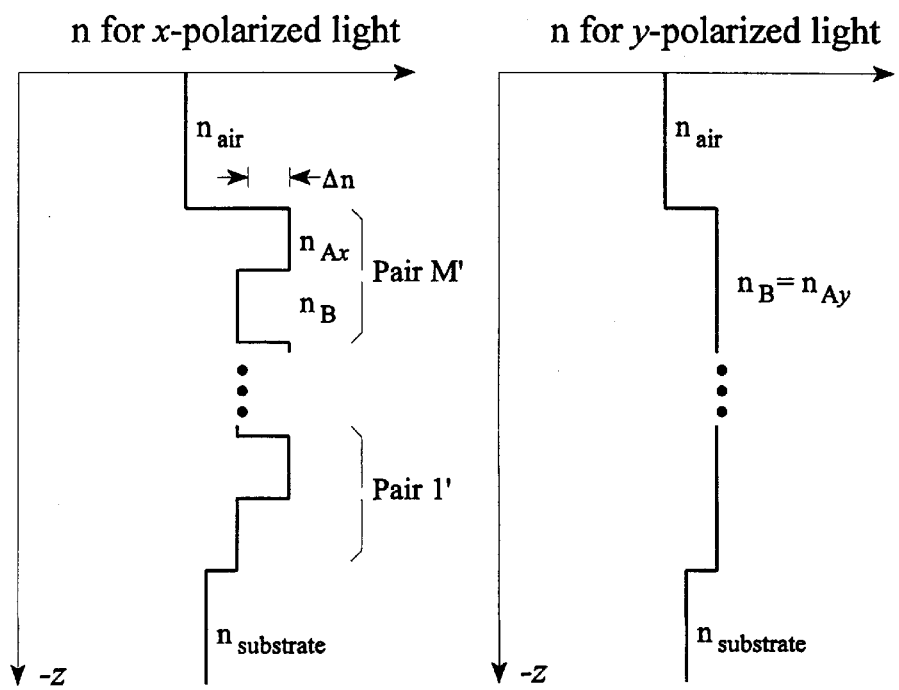
FIG. 3B is a view similar to that of FIG. 2B, for the linear polarizer of FIG. 3A.

Turning now to FIG. 3A, an alternate embodiment of the present invention is shown as polarizer 126. In this embodiment, optically birefringent layers 132 and 136 are composite layers, including a plurality of birefringent sublayers having optic axes c (and planar components c') in the xz-plane. Layer 132 includes sublayers 134 and 135, while layer 136 includes sublayers 138 and 140. Individually, each sublayer preferably has substantially the same degree of birefringence as birefringent layers 32 and 36 (FIG. 2A), but their optic axes c of adjacent sublayers are preferably each disposed at alternating angles of $+\gamma$ and $-\gamma$ in the xz-plane, as shown with respect to layers 134 and 135. These sublayers are obtained by thin film deposition of material A alternately at oblique angles $+\theta$ and $-\theta$, (FIG. 12A) respectively, in the xz plane. The total thickness of each composite layer 132, including sublayers 134 and 135, is a quarter wave, given by $t_{134}+t_{135}=\lambda_0/4n_H$ where t denotes the thickness of a sublayer. Similarly, the combined thickness of sublayers 138 and 140 is also a quarter wave, $t_{138}+t_{140}=\lambda_0/4n_H$. Thus, optically, composite layer 132 is equivalent to a single birefringent layer of quarter wave thickness with refractive indices $n_{Ax}$ and $n_{Ay}$. In this regard, as shown in FIG. 3B, the refractive indices of linear polarizer 126, for x- and y-polarized light, are substantially identical to those shown in FIG. 2B for polarizer 26. However, it may be advantageous to deposit a film as several relatively thin sublayers, rather than fewer thicker layers, to, for example, limit fractal columnar growth and facilitate film uniformity.

In this regard, one skilled in the art will recognize that as film thickness increases, columnar growth therein becomes increasingly fractal-like, leading to excess light scattering of the film. As taught herein, this problem may be avoided or minimized by limiting such growth through use of relatively thin film layers. In this regard, each time deposition of one layer is stopped, an another layer begun, such as by changing deposition angle $\theta$, the columnar growth is stopped and new growth starts again from a 'zero' datum. In light of the above, although it is preferred to deposit each adjacent sublayer at alternate oblique angles $+\theta$ and $-\theta$, it is contemplated that the present invention may be practiced by depositing adjacent discrete sublayers at the same angle $\theta$.

Another advantage, however, of depositing sublayers at alternate oblique angles $+\theta$ and $-\theta$ is that such an approach enables the sublayers to compensate one another to provide the composite layer with improved uniformity in thickness. Inherent to the oblique deposition geometry shown in FIG. 13, the film tends to be non-uniform depending on proximity to an evaporant source 566. When deposited at $+\theta$, the layer at the top region of the substrate (farther away from the source) will be thinner than the film at the bottom region (closer to the source). When depositing at $-\theta$, the substrate is effectively rotated 180 degrees about the z-axis. The film deposited at $-\theta$ thus has similar, but opposite non-uniformity in thickness relative the $+\theta$ film. The non-uniformities of these two sublayers, i.e. sublayers 134 and 135, thus compensate one another such that the thickness of the resulting composite film layer (i.e. layer 132) is substantially uniform.

Figure 5A:
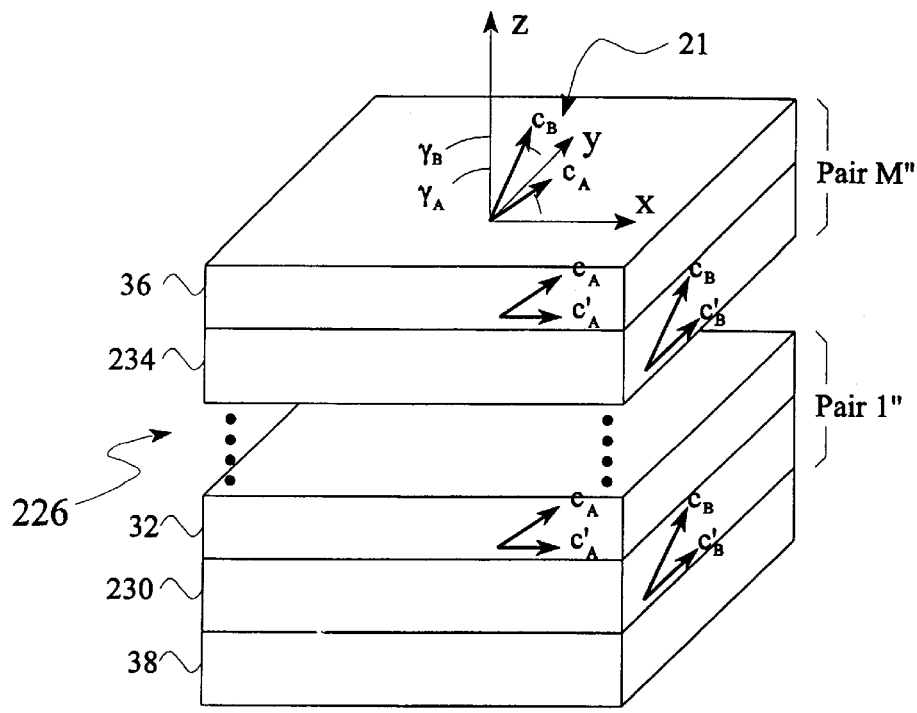
FIG. 5A is a view similar to that of FIG. 2A, of another preferred embodiment in accordance with the present invention.

Referring now to FIG. 5A, in another exemplary embodiment, a linear polarizer 226 includes pairs of alternating birefringent layers 230 and 32, and 234 and 36 disposed on substrate 38. Layers 230 and 234 are obliquely deposited in the yz-plane with material B. The optic axis $c_B$, and the planar component thereof, $c_B'$, of each layer 230 and 234 is in the yz-plane with $n_y(B)>n_x(B)$. These layers are each a quarter wavelength thick ($\lambda_0/4n_L$), where $\lambda_0$ is the characteristic wavelength of the linear polarizer. Layers 32 and 36 are obliquely deposited with material A in the xz-plane as discussed hereinabove, with optic axis $C_A$ of these layers in the xz-plane, with $n_x(A)>n_y(A)$. The materials and deposition process are chosen such that $n_y(A)=n_y(B)$. Accordingly, to utilize terminology common in the art, $n_x(B)$ is defined as $n_L$ ($n_x(B)=n_L$) and $n_x(A)$ is defined as $n_H$ ($n_x(A)=n_H$). This deposition procedure is then repeated until a stack of M" paired birefringent layers have been applied to substrate 38. As shown, layers 234 and 36 form the last pair of the stack, Pair M".

Figure 5B:
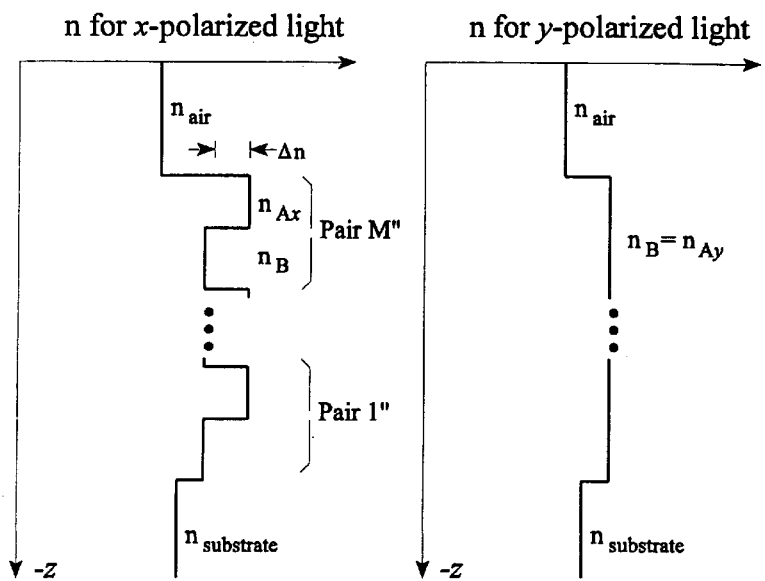
FIG. 5B is a view similar to that of FIGS. 2B and 3B, for the polarizer of FIG. 5A.

As shown in FIG. 5B, the profile of refractive indices for light polarized in the x- and y-axes is similar to those shown in FIGS. 2B and 3B. Polarizer 226 exhibits strong reflection over a band centered at the wavelength $\lambda_0$ for light polarized in the x-direction as the multilayer stack consists of layers with different refractive indices $n_H$ and $n_L$. Polarizer 226 exhibits high transmittance for the light polarized in the y-direction as the multilayer stack is effectively an isotropic medium, $n_y(A)=n_y(B)$. Thus, polarizer 226 functions in the manner described hereinabove with regard to polarizers 26 and 126, to selectively reflect light of one linear polarization component and transmit the orthogonal component, to thus function as a linear polarizer. The advantage of polarizer 226 over the embodiment of polarizer 126 (FIG. 2A) is that be effectively adding the birefringences of two layers as shown and described, $\Delta n$ (in the x-direction), for every pair of quarter wavelength layers, is relatively larger. This aspect enables polarizer 226 to be advantageously fabricated with relatively fewer quarter wavelength pairs, for lower relative complexity and manufacturing expense. This larger birefringence may also provide relatively increased bandwidth as discussed hereinabove.

Figure 7:
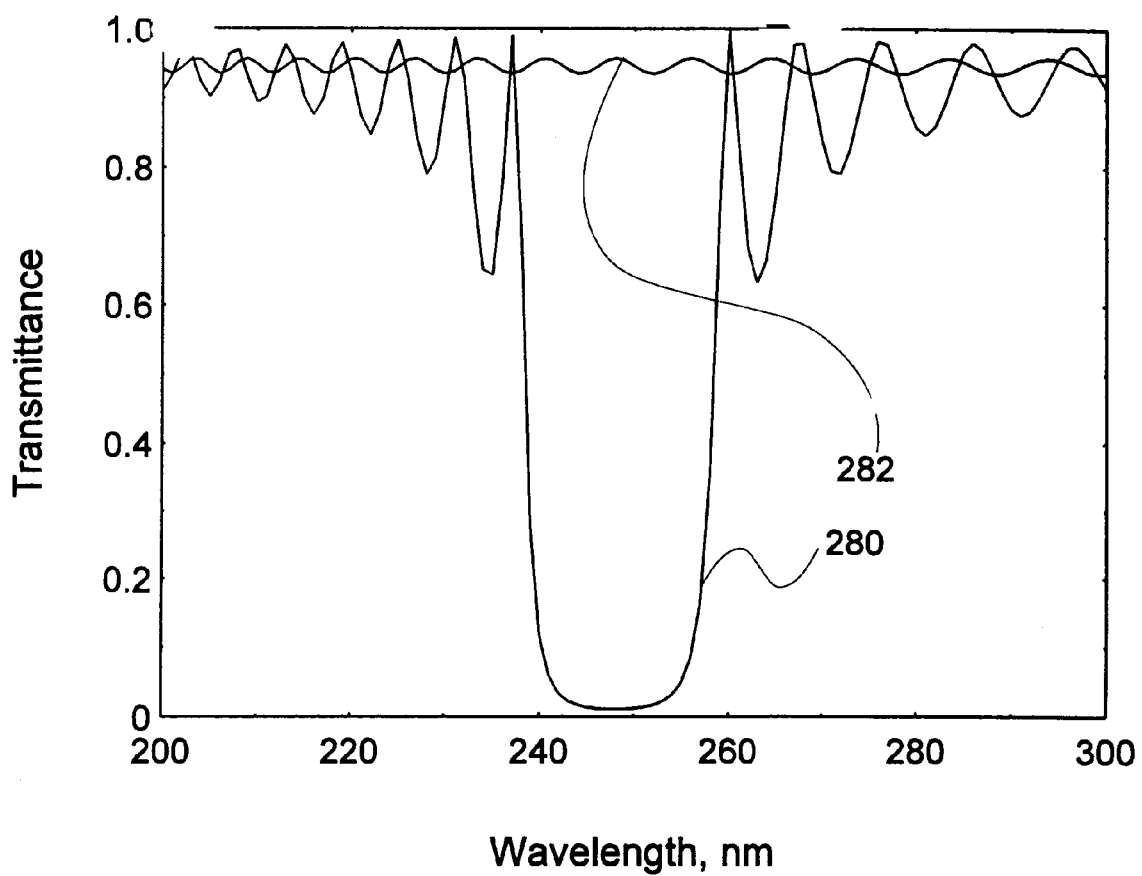
FIG. 7 is a graphical representation of transmittance spectra for light polarized parallel and perpendicular to the optic axes of the birefringent thin film stacks of FIGS. 5A and 6A.

Referring now to FIG. 7, transmittance spectra 280 and 282 for the x- and y-polarized light, respectively, is provided for an illustrative example of a polarizer 226 having 27 quarter wavelength pairs, effective $\Delta n=0.16$ and an average refractive index of 1.8. As shown, this example exhibits a relatively wide bandwidth (approximately 20 to 30 nm) and a high extinction ratio (approximately 100). Moreover, it is expected that the extinction for this example may be improved by increasing $R_x^{max}$, as set forth hereinabove, with a larger number of pairs and decreasing $R_y^{max}$, as also set forth hereinabove, by choosing $n_{substrate}=n_B=n_y(A)$.

Figure 6A:
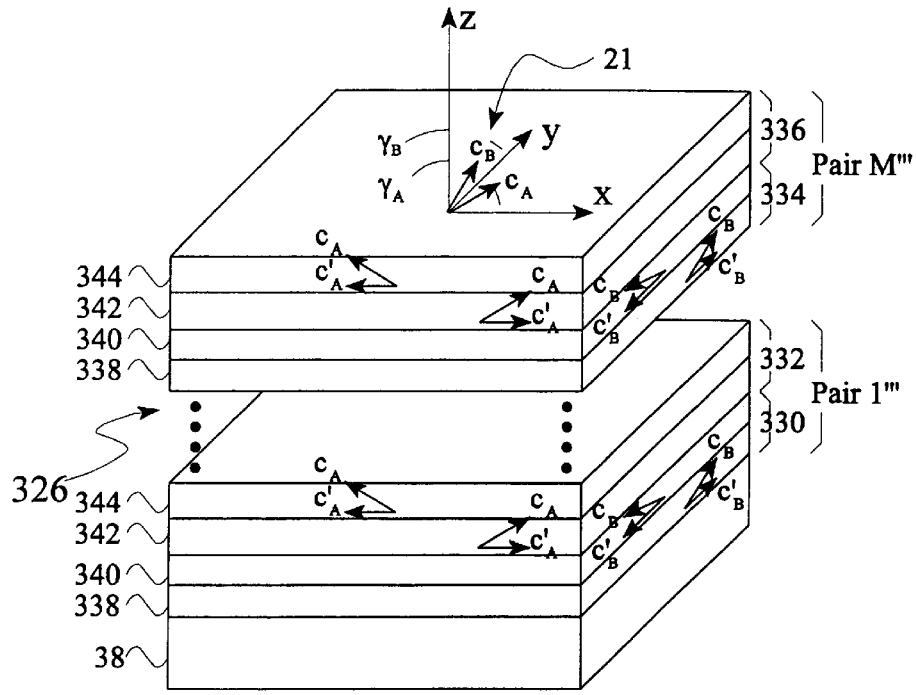
FIG. 6A is a view similar to that of FIG. 2A, of another preferred embodiment in accordance with the present invention.

Turning now to FIG. 6A, an alternate embodiment of linear polarizer 226 (FIG. 5A) is shown as polarizer 326 and includes optically birefringent composite layers 330, 332, 334 and 336. Each composite layer 330, 332, 334 and 336 includes a plurality of birefringent sublayers.

As shown, layers 330 and 334 each include sublayers 338 and 340. Sublayers 338 and 340 each preferably have the same birefringence as one another, but with their optic axes $c_B$ (and planar components, not shown) alternately disposed at an angle of $+\gamma$ and $-\gamma$, respectively, in the yz-plane. These sublayers are obtained by oblique thin film deposition of material B in the yz plane alternately at oblique angles $+\theta$ and $-\theta$, respectively, relative the z-axis. The combined thickness of sublayer 338 plus sublayer 340 is a quarter wave, given by $t_{338}+t_{340}=\lambda_0/4n_L$ where t denotes the thickness of the respective sublayer. Layers 330 and 334 are optically equivalent to quarter wavelength birefringent layers 230 and 234 described hereinabove, having refractive indices $n_{Bx}$ and $n_{By}$.

Figure 6B:
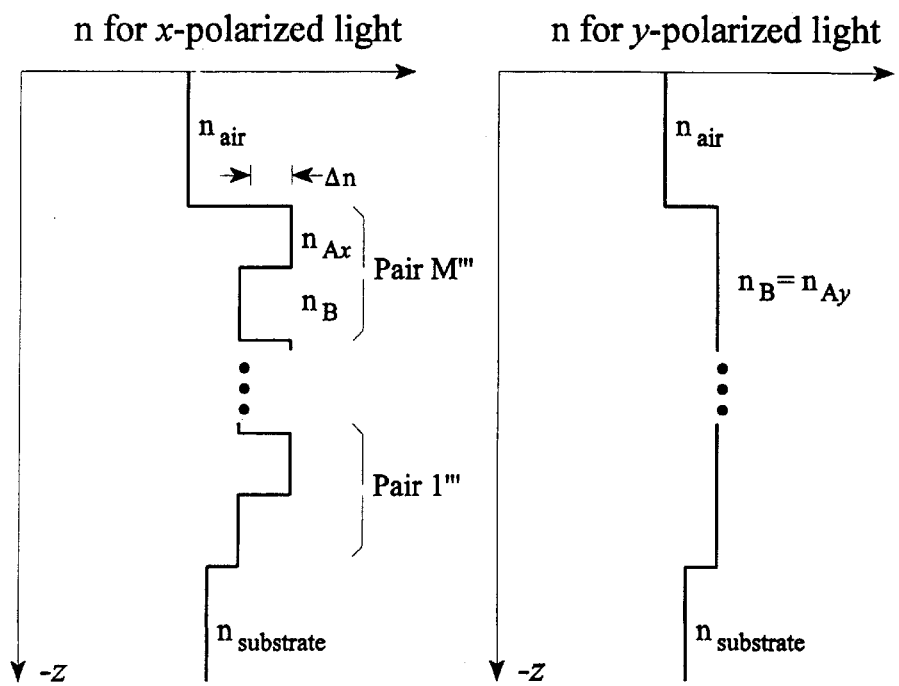
FIG. 6B is a view similar to that of FIGS. 2B, 3B and 5B, for linear polarizer shown in FIG. 6A.

Similarly, birefringent layers 332 and 336 each include sublayers 342 and 344. Sublayers 342 and 344 each have substantially identical birefringence, but with their optic axes alternating at an angle $+\gamma$ and $-\gamma$, respectively, in the xz-plane. These sublayers are obtained by oblique thin film deposition of material A in the xz plane alternately at oblique angles $+\theta$ and $-\theta$, respectively. The total thickness of each pair of sublayers 342 and 344 is a quarter wave, $t_{342}+t_{344}=\lambda_0/4n_H$ where t denotes the thickness of sublayers. The optical reflectance or transmittance of polarizer 326 is similar to that of polarizer 226 (FIG. 5A), as both have similar profiles of refractive indices as shown in FIG. 6B. However, it may be advantageous to deposit composite sublayers to achieve film uniformity as discussed hereinabove.

There are several other configurations suitable for creating thin film multilayer linear polarizing coatings of the present invention. Notably, conventional optical techniques such as utilization of a disordered film stack, i.e. a film stack of alternating layers not of exactly quarter wavelength thickness, as well as conventional Fourier transform methods, may be utilized in a manner familiar to those skilled in the art, in combination with the teachings of the present invention, to design polarizers of substantially any desired reflectance or transmittance spectra. An example of such a conventional disordered film stack technique utilized to produce an optical reflector is disclosed by Zhang et al in *Applied Physics Letters,* 67, 679(1995), while a common Fourier transform technique is described by Dobrowolski and Lowe, in *Applied Optics,* 17, 3039 (1978), both of which are hereby incorporated by reference herein in their entireties.

Notably, the advantage of a disordered stack over a traditional quarter-wave stack is that a broader reflective spectral band may be achieved. All of the embodiments of the present invention discussed herein may be fabricated using such a disordered stack. In this regard, a reflective coating example utilizing layers of other than quarter-wave thickness is shown in subsection 41 of the above-referenced *Filters and Coatings,* which subsection is hereby incorporated by reference in its entirety, herein. Specifically, an example is given for a pair of layers of thickness $n_A t_A + n_B t_B = \lambda_0/2$. Other examples of high-reflector coatings of non quarter-wave film stacks are familiar to those skilled in the coating art.

It should thus be apparent to the skilled artisan that a multilayer film stack of birefringent layers having substantially any thickness, that utilizes the birefringence of the layers to reflect one linearly polarized light component to a substantially greater degree than an orthogonally polarized light component, is within the spirit and scope of the present invention.

Further embodiments of the present invention comprise circular polarizers. Referring now to FIG. 8A, a circular polarizer 426 includes a stack of superposed birefringent layers 438. A single helical pitch is shown, with the understanding that additional layers and concomitantly, additional pitches, are preferably superimposed or stacked thereon to improve performance thereof according to Eq 2d discussed hereinbelow. Each layer 438 is effectively rotated about the z-axis relative to immediately adjacent layers 438. In this regard, optic axis c of each layer 438 has a planar component c' disposed in the xy-plane as shown. The direction of component c' of each layer 438 is rotatably offset relative to that of each adjacent layer 438 to a predetermined extent about the z-axis. The direction of the optical axis c of each birefringent layer 438, is given by $(\beta, \gamma)$, where $\beta$ is the angle between the x-axis and the x. component c', and $\gamma$ is the angle between c and z-axis as defined hereinabove. As shown, angle $\beta$ is preferably constant for each layer, $\beta=360°/J$, where J is an integer. The optical axis c, as shown by x. component c', of each successive layer 438, is rotated about the z-axis either clockwise or counterclockwise by an equal predetermined amount, to trace a helix along the z-axis. The pitch or period, $P_0$, is the thickness of the number of layers required to complete a full 360 degree revolution of components c'. In the example shown, polarizer 426 requires six layers to complete a full evolution, as x. component c' of each layer is oriented at $(0°, \gamma)$, $(60°, \gamma)$, $(120°, \gamma)$, $(180°, \gamma)$, $(240°, \gamma)$ and $(300°, \gamma)$, respectively. A polarizer of this type is defined as right-handed (RH) chiral film is $\beta>0$, and left-handed (LH) chiral film if $\beta<0$.

Circular polarizers of the type described hereinabove and shown with respect to polarizer 426 have a reflectance band for circularly polarized light of a bandwidth:

$$\Delta\lambda \approx (\Delta n/n_{av})\lambda_0 \quad (2a)$$

centered at the characteristic wavelength $$\lambda_0 = n_{av} P_0, \quad (2b)$$

where $n_{av}$ is the average index of refraction, given by $(n_x + n_y)/2$. Variables $n_x$ and $n_y$ are refractive indices along the x- and y-axes, respectively. Thus, the wavelength-dependent circular dichroism can be controlled by the deposition rate, inclination of the film material itself, as will be taught hereinafter. The reflectance (R) vs wavelength is given by $$R = \sin h^2 \{\kappa L[1-(\delta/\kappa)^2]^{1/2}\}/\cos h^2 \{\kappa L[1-(\delta/\kappa)^2]^{1/2}\} - (\delta/\kappa)^2 \quad (2c)$$

where $\delta = 2\pi n_{av}(1/\lambda - 1/\lambda_0)$, $\delta/\kappa = 2(n_{av}/\Delta n)(1-\lambda/\lambda_0)$ and L is the thickness of the chiral film stack.
The peak reflectance $R_P$ is:

$$R_P = \tan h^2[\pi(\Delta n/n_{av})(L/P)].$$

The selective reflectance arises from Bragg-type optical interferences familiar to one skilled in the art.

Figure 9A:
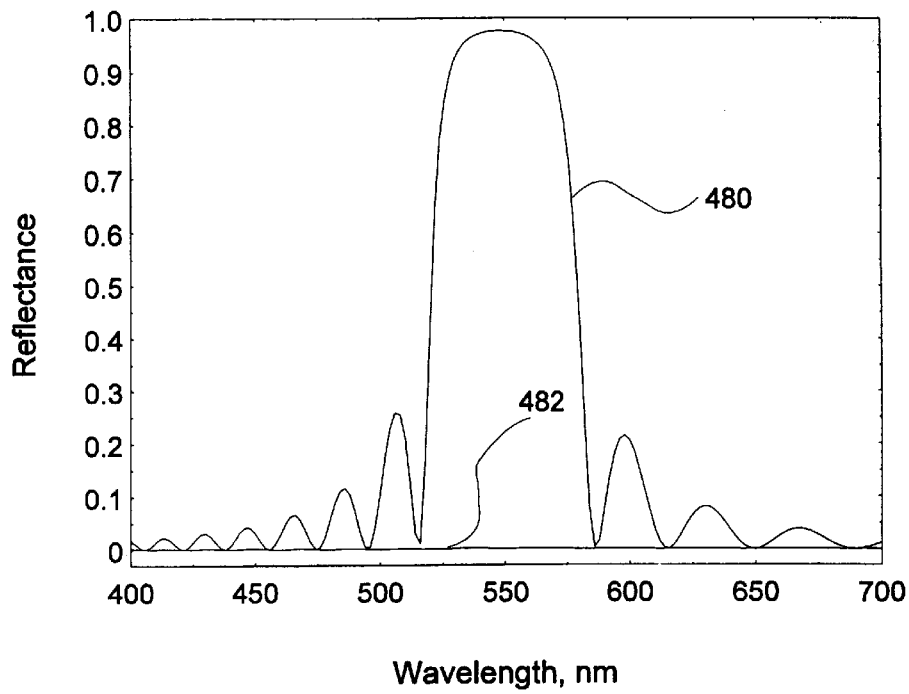
FIG. 9A is a graphical representation of reflectance spectra for right-handed circularly polarized and left-handed circularly polarized light incident on the circular polarizer of FIG. 8A.
Figure 9B:
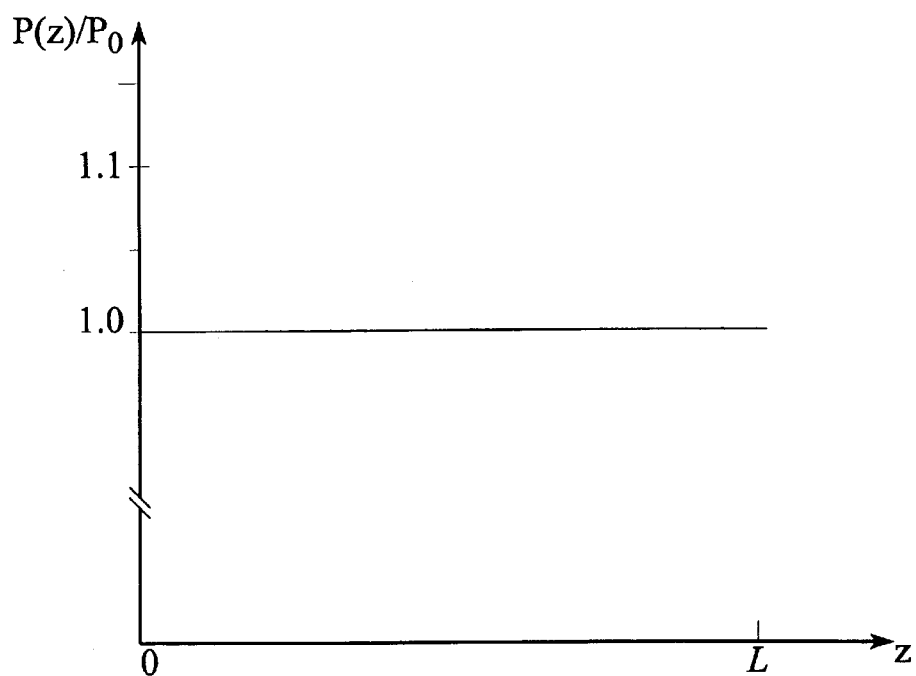
FIG. 9B is a graphical representation of the pitch distribution of a circular polarizer of the type shown in FIG. 8A.

FIG. 9A illustrates the calculated reflectance spectra of a right-handed polarizer of the type described hereinabove with regard to polarizer 426, for right-handed circularly polarized (RHCP) and left-handed circularly polarized (LHCP) light is shown at 480 and 482, respectively. The design parameters were $n_{av}=2.2$, $\Delta n=0.2$, $\lambda_0=550$ nm, $P_0=250$ nm, the film stack has 10 pitches (L/P$_0$=10) and each pitch consists of 8 layers of same thickness t (t=P$_0$/8). The pitch at any given point along the z-axis (P(z)) is constant over the entire stack, as illustrated in FIG. 9B. As shown, a pitch P(z) at any particular layer of polarizer 426, divided by initial pitch P$_0$ (the pitch closest to the substrate is equal to one.

Figure 10:
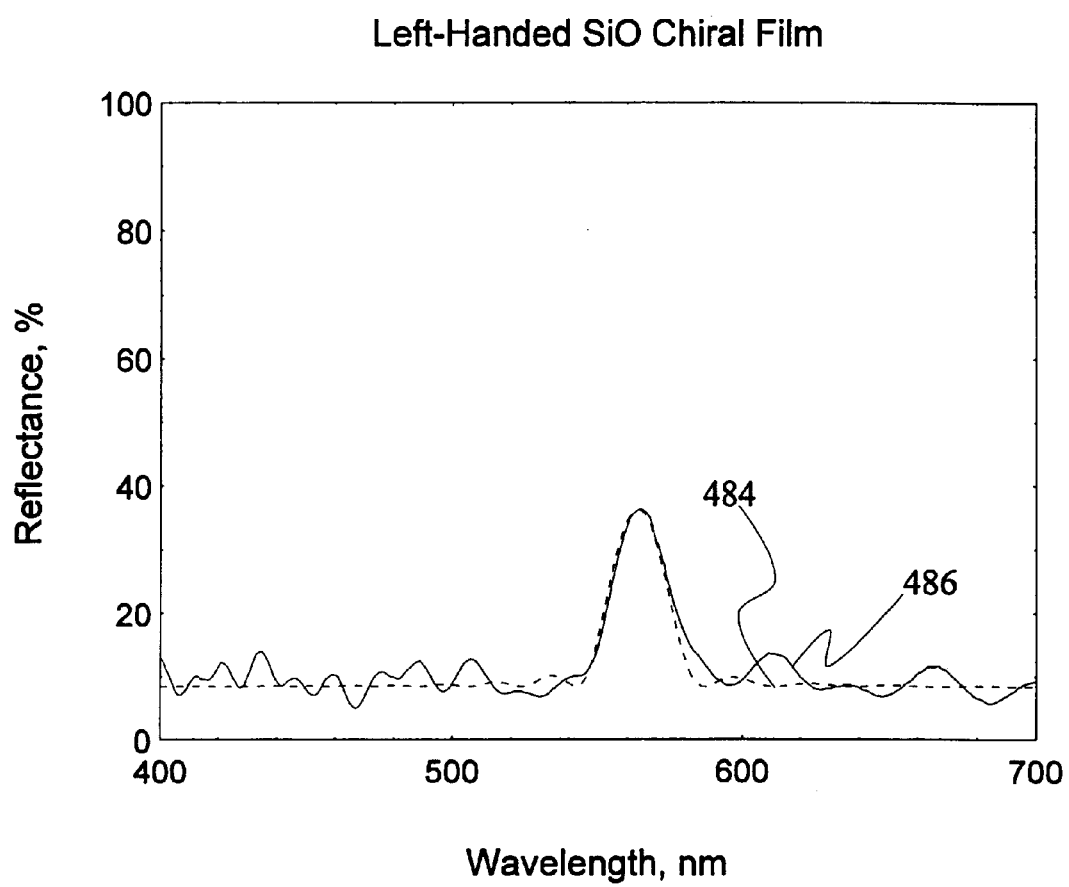
FIG. 10 is a graphical representation of a reflectance spectrum of a circular polarizer of the type shown in FIG. 8A.

Referring now to FIG. 10, calculated and experimental reflectance spectra 484 and 486, respectively, are provided for an additional example. In this example, a left-handed circular polarizer as taught by the present invention was provided, having a stack of SiO film layers cyclically rotated as discussed hereinabove. The pitch of the chiral film consisted of eight birefringent layers and was constant. The layers, which were all of the same thickness, were deposited at an oblique angle of θ=65°. A total of 104 layers were deposited on a glass substrate which was successively rotated counterclockwise by 45° after each layer was deposited. The substrate was rotated 13 complete turns, resulting in a chiral film with 13 pitches. The peak reflectance was about 35% for the chiral film with opposite chirality, i.e. for RHCP light. It is anticipated that a polarizer constructed according to this example having approximately 54 pitches would have a 100% reflectance of RHCP light.

By changing the pitch distribution, across the film stack, or providing the stack with a "gradient pitch distribution", a relatively broader reflectance band of a circular polarizer may be obtained. A gradient pitch distribution may be provided by increasing the angle β, by increasing the thickness of succeeding layers, or by a combination of these approaches. In this regard, mathematically, a pitch gradient means that the derivative dP(z)/dz is non-zero. For a linear gradient pitch, dP(z)/dz=constant, to indicate that the rate of change in pitch is constant. Since the polarizer is a stack of discrete layers, the derivative may be expressed as a difference ratio $\Delta P(z)/\Delta z$, as illustrated in Table I hereinbelow, in connection with varying layer thickness. This difference ratio $\Delta P(z)/\Delta z$ may thus be affected by the changing $\Delta P(z)$ and/or $\Delta z$.

Thus, for example, referring now to FIG. 8B, a polarizer 426' similar to polarizer 426 (FIG. 8A) may be fabricated with a gradient pitch distribution by increasing angle β for each succeeding layer, while keeping the thickness of each layer 438 equal. For example, β may be 35°, 45°, 55°, 65°, 75°, 85°, ..., for an initial pitch P$_0$ of 6 layers, as shown, with β increasing by 10° for each succeeding layer, respectively. The accumulative angular offsets are 35°+45°+55°+65°+75°+85°=360°, a complete turn.

Referring now to FIGS. 8B1 and 8B2, the rotation of c' for the successive layers, as well as and side view showing uniform layer thickness, is shown. It should be clear that there are fewer layers per pitch as angle β increases. In this regard, a pitch at any particular point along the z-axis may include a non-whole number of layers, i.e. the number of layers required to make a complete 360° rotation for c' is not an integer. As shown, a complete pitch from layer 7 in the +z direction is complete between layer 17 and layer 12.

As an alternative, as shown in FIGS. 8C, 8C1 and 8C2, a polarizer 426" is similar to polarizer 426', with the exception that it may be provided with a gradient pitch distribution by increasing layer thickness for succeeding layers, while keeping β constant. The following table illustrates a gradient pitch distribution of polarizer 426" in which twist angle β is constant at 60°, so that the pitch is the thickness of six layers. Table I below thus shows the instantaneous pitch at any particular layer or point along the z-axis, calculated as thickness of six layers of the given thickness.

TABLE I

| Layer | 1 | 2 | 3 | 4 | 5 | 6 | 7 | 8 | 9 | 10 | 11 | ... |
|---|---|---|---|---|---|---|---|---|---|---|---|---|
| Thickness, unit | 0.1 | 0.2 | 0.3 | 0.4 | 0.5 | 0.6 | 0.7 | 0.8 | 0.9 | 1.0 | | |
| Pitch at layer 1 | 0.6 | | | | | | | | | | | |
| Pitch at layer 2 | | 1.2 | | | | | | | | | | |
| Pitch at layer 3 | | | 1.8 | | | | | | | | | |
| Pitch at layer 4 | | | | 2.4 | | | | | | | | |

As mentioned hereinabove, as opposed to a polarizer 426 (FIG. 8A) of constant pitch, alternate embodiments 426' and 426" have a pitch (P(z)) that progressively varies as a function of the location along the z-axis thereof. Pitch P(z) at any point along the z-axis of polarizers 426' and 426", is given by the following equation, where z equals the distance in the z-direction from the substrate (not shown) and δP is the total change in pitch along the entire length L of the polarizer:

$$P(z) = P_0 + (z/L)\delta P. \quad (3)$$

Figure 11A:
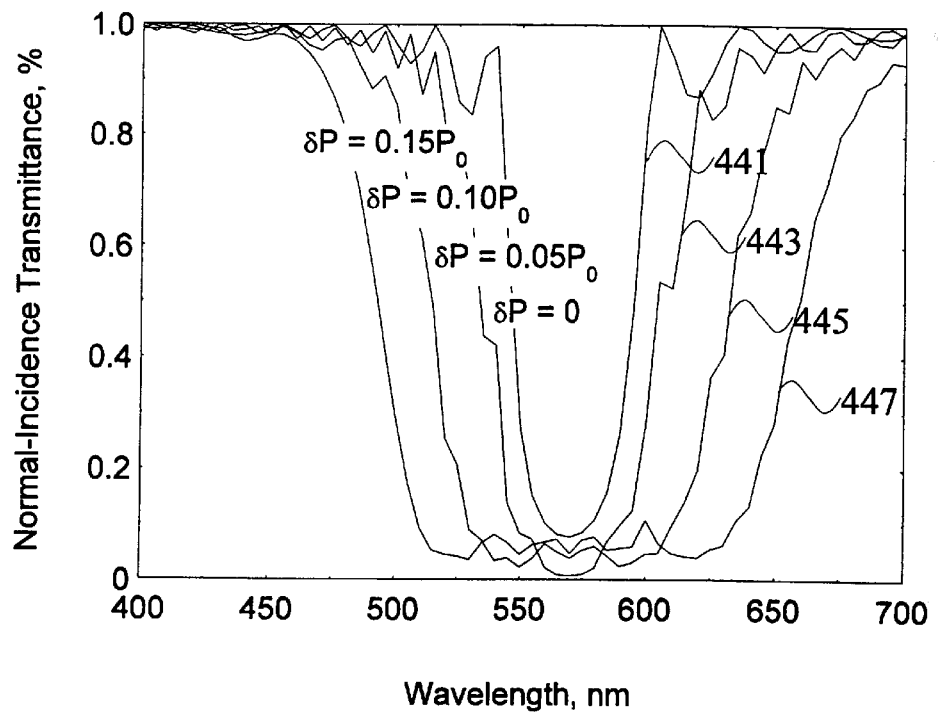
FIG. 11A is a graphical representation of reflectance spectra of circular polarizers of the type shown in FIG. 8, having a non-constant pitch distribution.
Figure 11B:
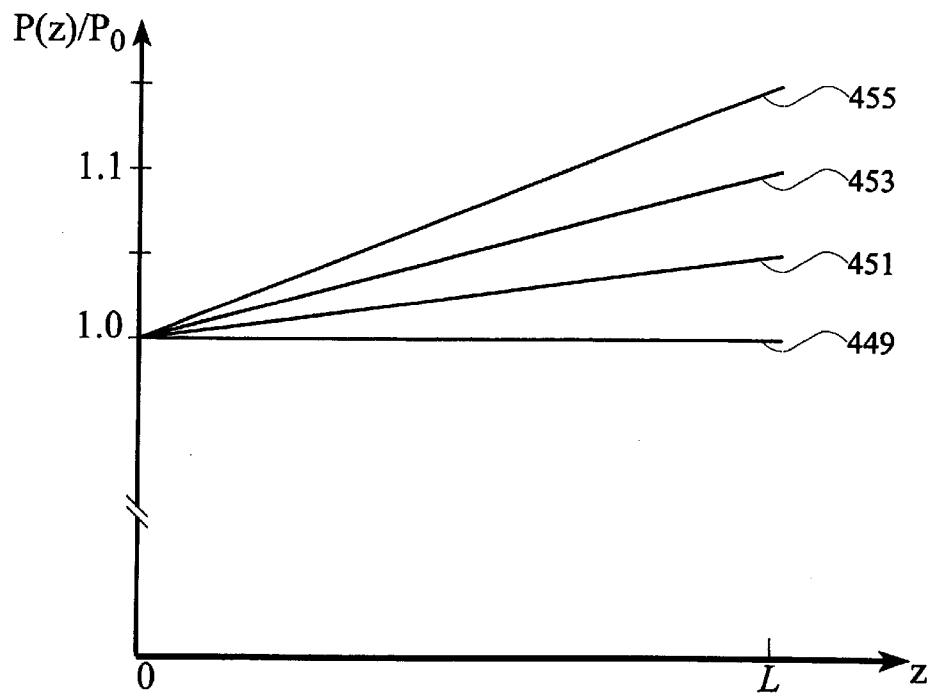
FIG. 11B is a graphical representation of the pitch distribution of a circular polarizer of the type shown in FIG. 11A.

Turning to FIG. 11A, reflectance spectra of examples of polarizers 426' and 426" are shown with their corresponding pitch distributions graphically shown in FIG. 11B. As shown in FIG. 11A, a polarizer 426 (FIG. 8A) having constant pitch (δP=0) has a transmittance curve 441. A polarizer 426' (FIG. 8B) and 426" (FIG. 8C) having a progressively increasing pitch, where δP=0.05P$_0$, yields transmittance curve 443 of broader bandwidth than curve 441. Similarly, further increases in δP, to 0.10P$_0$ and 0.15P$_0$, yield even broader bandwidth curves 445 and 447, respectively. As shown in FIG. 11B, the pitch distributions of the circular polarizers exhibiting curves 441, 443, 445 and 447 of FIG. 11A are shown graphically at plots 449, 451, 453 and 455, respectively. As shown, these plots are straight lines and thus indicative of linear gradients. The skilled artisan will recognize, however, that a polarizer having a nonlinear gradient distribution of P(z), according to Equation 3 hereinabove, may also be fabricated. The corresponding pitch distribution of such a polarizer, would be curved when plotted in a manner similar to that of FIG. 11B.

Figure 18A:
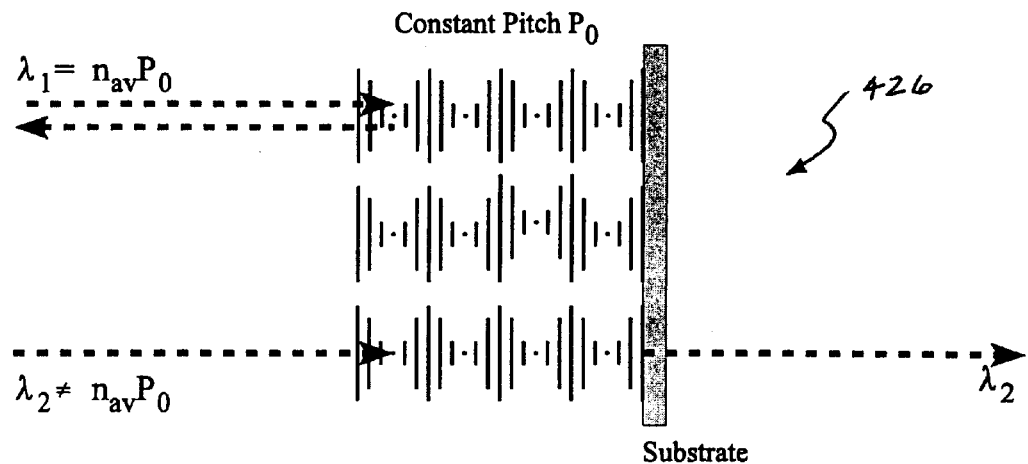
FIG. 18A is a diagrammatic side elevational representation of a polarizer of the type shown in FIG. 8A, with some layers thereof not shown, and including light incident thereon.
Figure 18B:
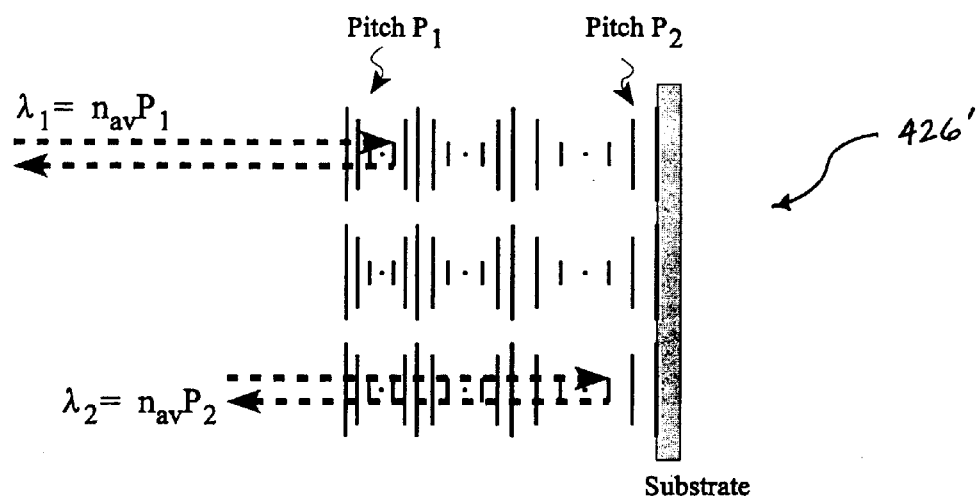
FIG. 18B is a diagrammatic side elevational representation of a polarizer of the type shown in FIG. 8B, with some layers thereof not shown, and including light incident thereon.

This broadening of the reflectance bandwidth by varying pitch distribution may be further explained by reference to FIGS. 18A and 18B. For a polarizer 426 of constant pitch, $P_1$ as shown in FIG. 18A, the reflectance band is centered at the characteristics wavelength $\lambda_1 = n_{av} P_1$ with a bandwidth $\Delta\lambda = (\Delta n / n_{av}) \lambda_1$ where $n_{av}$ is the average index of refraction of the material and $\Delta n$ birefringence. For a film with a gradient pitch distribution, ($P_1$ to $P_2$), the reflectance band can be approximately $n_{av}(P_2 - P_1)$. With reference to FIG. 18B below, the film region with its pitch $P_1$ reflects light centered at the wavelength $\lambda_1 = n_{av} P_1$ and the film region with its pitch $P_2$ reflects light centered at $\lambda_2 = n_{av} P_2$ with a bandwidth. As the pitch of film is continuously varied from $P_1$ to $P_2$, a continuous reflectance band from $\lambda_1$ to $\lambda_2$ is reflected from such a film, thereby providing a broader bandwidth than simply the $\lambda_1$ bandwidth of the constant pitch example of FIG. 18A.

Figure 22A:
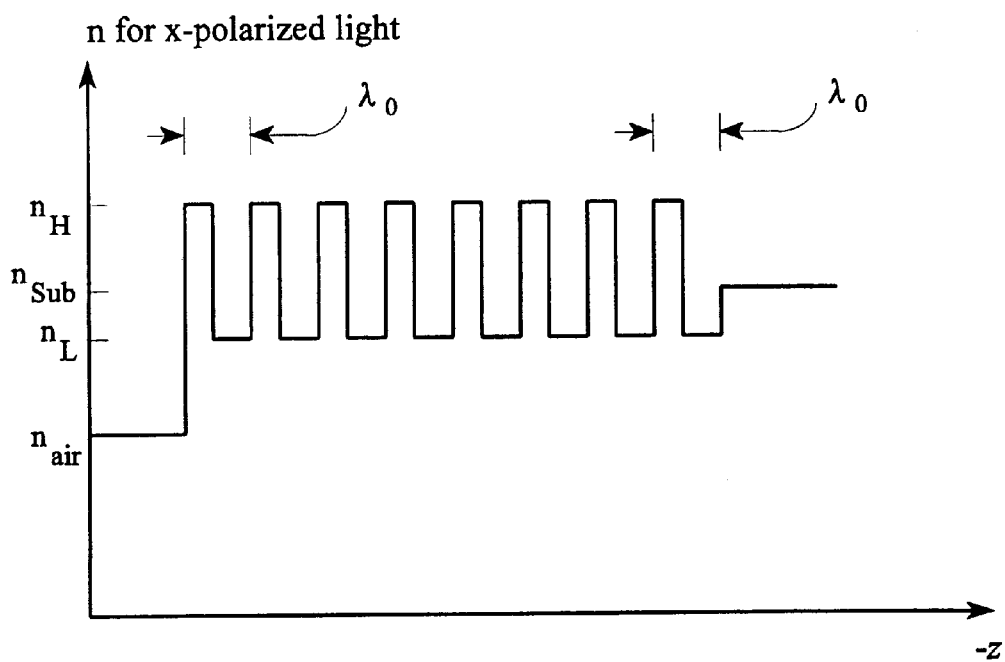
FIG. 22A is a graphical representation of the refractive indices of a linear polarizer of the type shown in FIGS. 2A and 3A, for x-polarized light.
Figure 22B:
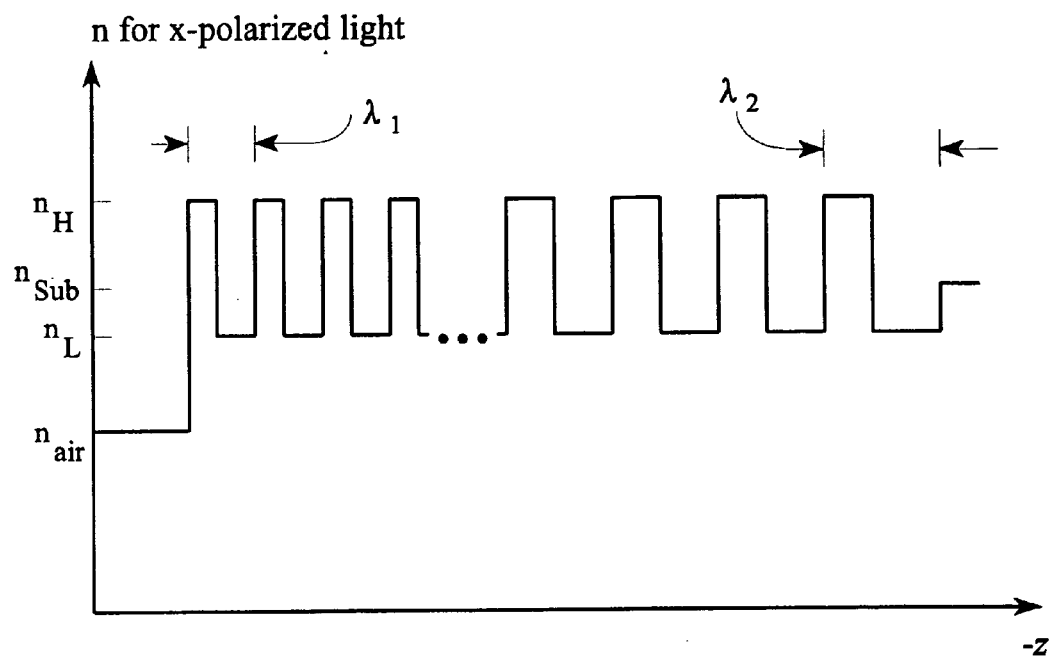
FIG. 22B is a view similar to that of FIG. 22A, for an alternate embodiment of a linear polarizer.
Figure 22C:
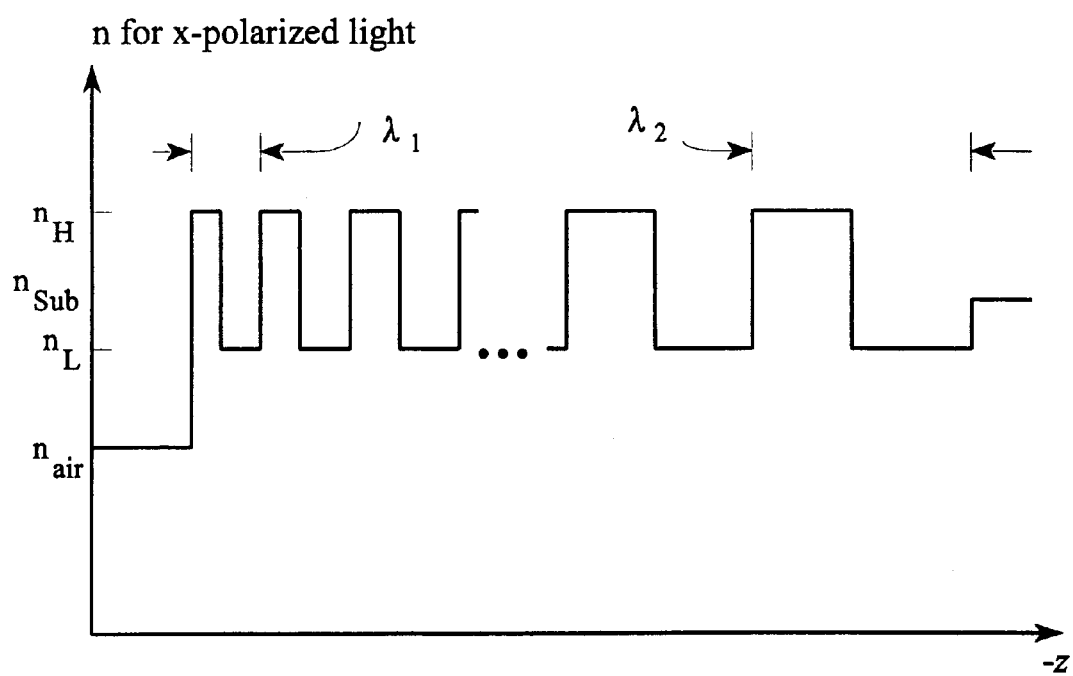
FIG. 22C is a view similar to that of FIGS. 22A and 22B of a still further embodiment of a linear polarizer.

Although the foregoing description discusses broadening the polarizing band of circular polarizers by varying the pitch along the z-axis, similar broadening may be obtained for linear polarizers. Referring now to FIGS. 22A, 22B and 22C, the polarizing bands of linear polarizers (e.g. polarizers 26 and 126 of FIGS. 2A and 3A) may be broadened by changing the quarter-wave thickness of a layer-pair. Referring now to FIG. 22A, the refractive indices of a linear polarizer 26 or 126 are indicative of a series of layers of substantially the same thickness $\lambda_0/4$. As shown in FIG. 22B, a similar polarizer has two discrete portions of layers, the first portion having layers of thickness $\lambda_1/4$ (for a characteristic wavelength $\lambda_1$) while the second portion has layers of thickness $\lambda_2/4$ (for a characteristic wavelength $\lambda_2$) to broaden the bandwidth. A variation on this approach is shown in FIG. 22C, in which the layers vary gradually in thickness from $\lambda_1/4$ to $\lambda_2/4$, wherein the polarizer portions gradually vary from a characteristic wavelength $\lambda_1$ to a characteristic wavelength $\lambda_2$ for broadening the bandwidth.

Figure 19A:
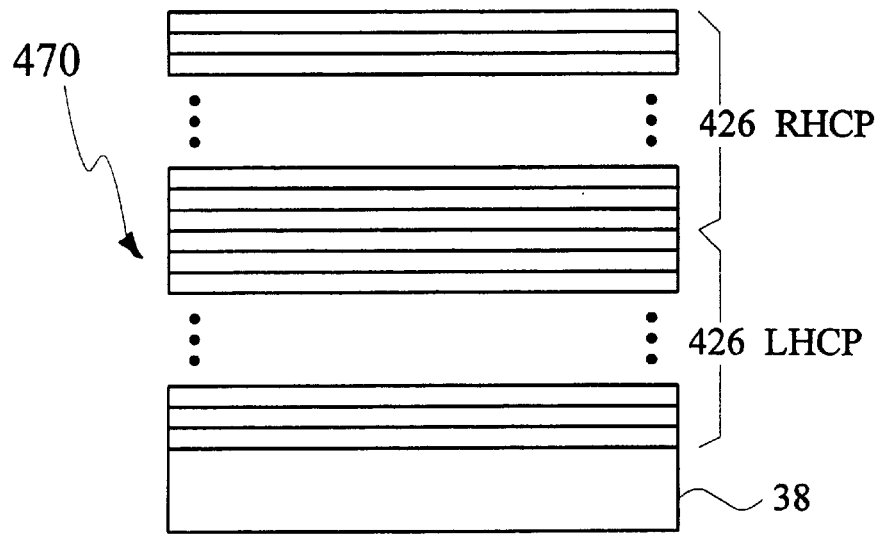
FIG. 19A is an elevational schematic representation of a representative portion of an additional embodiment of a polarizer of the present invention.
Figure 19B:
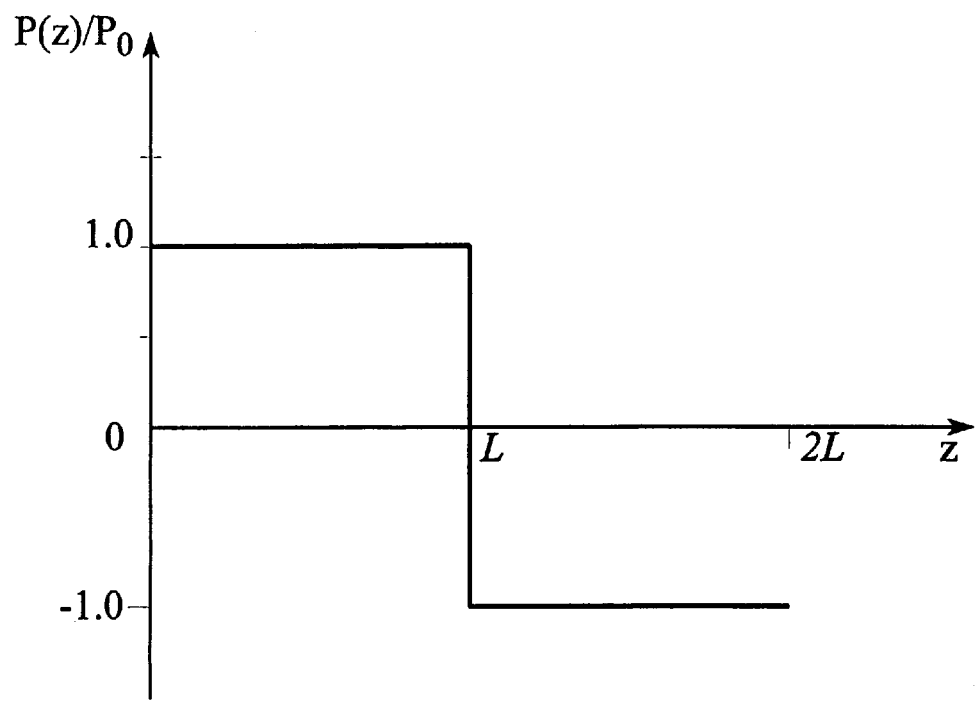
FIG. 19B is a graphical representation of the pitch distribution of the polarizer portion of FIG. 19A.

Additional embodiments of the polarizer of the present invention may include superposing two polarizers 426 of opposite chirality or orthogonality upon one another, as shown as polarizer 470 in FIG. 19A to effectively comprise a mirror that reflects incident light of a predetermined spectral range, regardless of its polarization. In this regard, pitches P and P' of the two polarizers are preferably constant and approximately equal to one another, $P \approx P'$, for near 100% reflectance of incident light over a specific spectral band. As shown, an LHCP polarizer 426 is stacked on an RHCP polarizer 426, which is, in turn, stacked on a substrate 38. The order of stacking is not critical, and both polarizers 426 are preferably superimposed directly onto one another, with no interlayers therebetween. This embodiment may be fabricated by first depositing a chiral film on the substrate, then changing the rotation of the substrate for depositing the second chiral film of opposite chirality. FIG. 19B, shows the pitch distribution of the chiral films which is constant. The sign (+ or −) indicates the chirality, which is dependent on the sign of angle β, discussed hereinabove.

In addition, N multiple structures of polarizer 426 may be superposed over one another, in the manner shown in FIG. 19A, each polarizer having a different constant pitch, $P_j$, where j=1, . . . , N. Polarizers 426 may be of either single-handed or opposite-handed chiralities. If opposite-handed chiralities are utilized, the resulting polarizer will be a mirror, as discussed hereinabove. Such a stack will generally provide a broader polarizing bandwidth, for the similar reason to that for a chiral film with gradient pitch. Briefly described, each stack of $P_j$ has a polarizing bandwidth centered at $\lambda_j$. Thus, by suitable spacing for $\lambda_1$, $\lambda_2$, and $\lambda_N$, a continuous polarizing band from $\lambda_1$ to about $\lambda_N$ can be obtained. In addition, for some applications, the reflection or polarizing band may be predetermined to consist of discrete bands. For example, such a device may be used to reduce and/or remove light at a predetermined spectral range, such as for color correction or alternatively, as a polarizing bandpass filter.

Figure 20A:
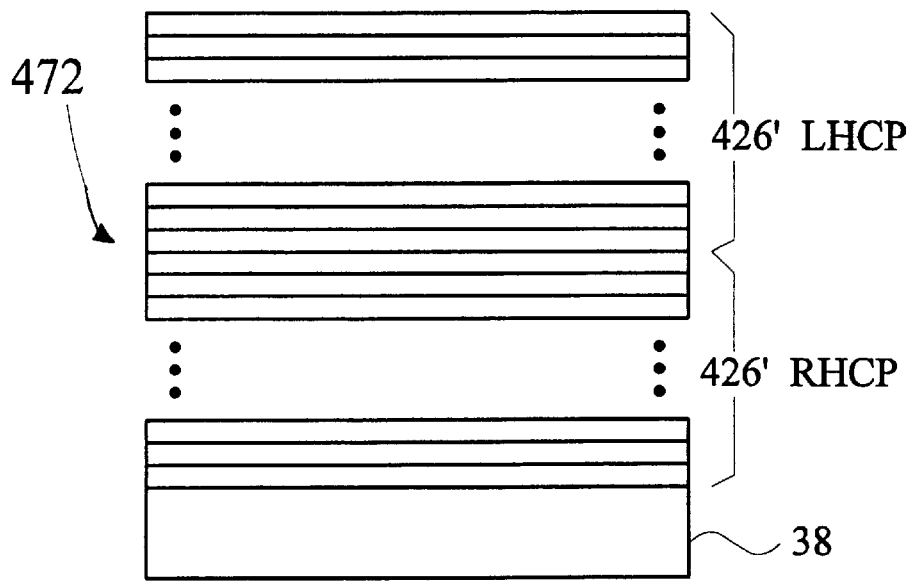
FIG. 20A is an elevational schematic representation of a representative portion of a further embodiment of a polarizer of the present invention.
Figure 20B:
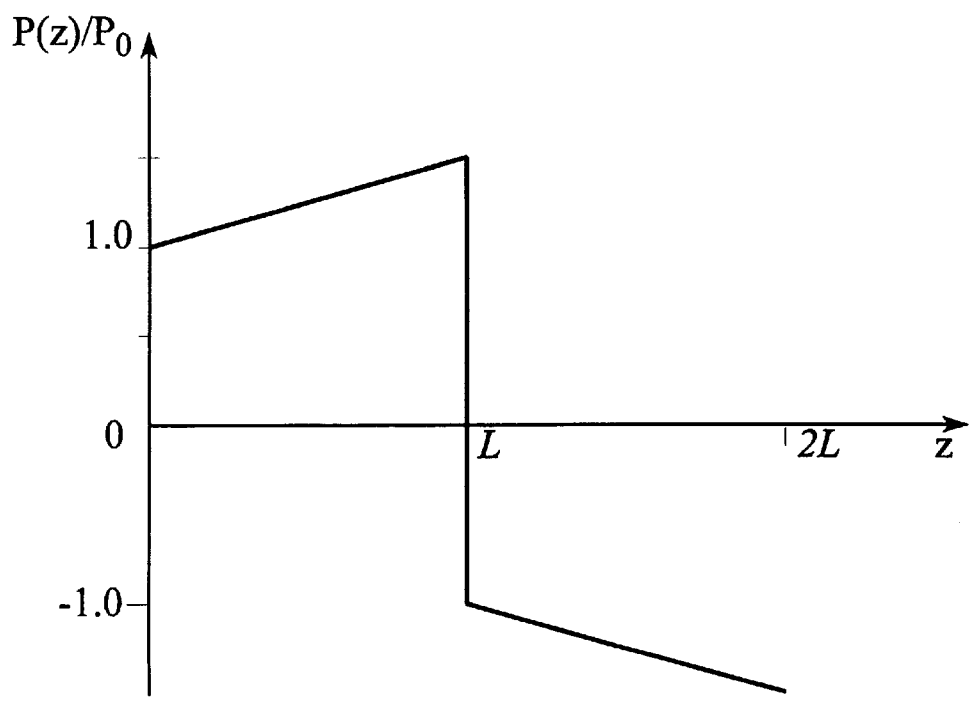
FIG. 20B is a graphical representation of the pitch distribution of the polarizer portion of FIG. 20A.

As shown in FIG. 20, a still further embodiment may include a film polarizer 472 including stacked polarizers 426' of opposite chiralities, to provide a multiple-pitched, chiral film polarizer. A variation of polarizer 472 may include use of single-handed polarizers 426' (not shown). Referring to FIG. 20B, the pitch distribution varies, from, for example, $+1.0P_0$ to $+1.5P_0$, then from $-1.0P_0$ to $-1.5P_0$. For normally incident light, the ordering of pitch gradient is generally not critical. For example, a pitch distribution from $+1.0P_0$ to $+1.5P_0$, then from $-1.5P_0$ to $-1.0P_0$, has similar characteristics.

Figure 21:
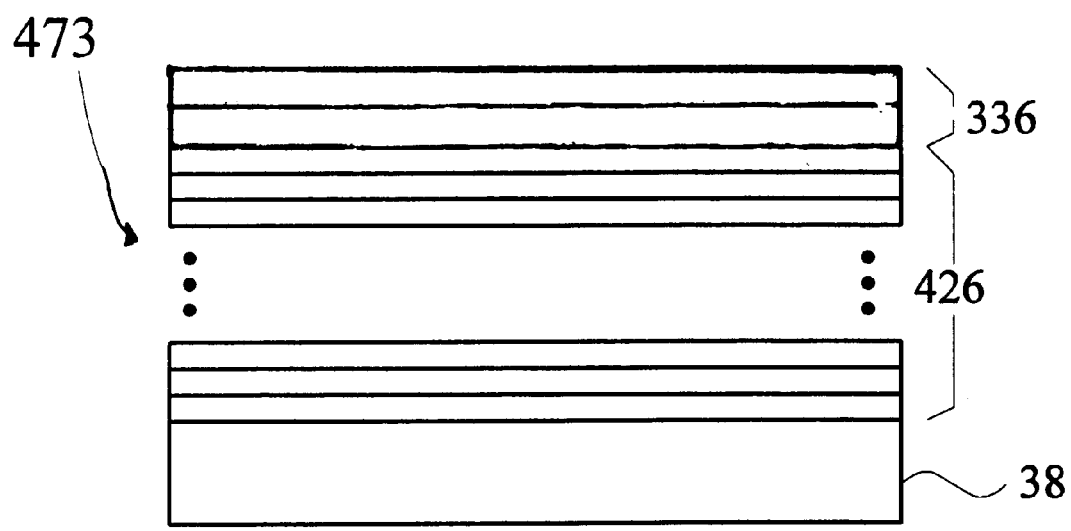
FIG. 21 is an elevational schematic representation of a still further embodiment of a polarizer of the present invention.

Referring to FIG. 21, a chiral film structure of one or more of the types described hereinabove may include a quarter-wave ($\lambda/4$) layer for converting transmitted light from circularly polarized to linearly polarized, to form a composite linear polarizer. As shown, for example, a polarizer 473 may include a substrate 38 provided with a chiral film or polarizer 426 disposed thereon, which is in turn, superimposed with, for example, a composite quarter-wave layer 336.

Having described the invention, exemplary methods, such as vacuum vapor deposition methods, used to obtain birefringent film layers for fabrication of the circular and linear polarizers of the present invention, are discussed hereinbelow. It has been known since at least 1886 that vapor-deposited thin films show birefringence. Moreover, obliquely deposited films are known to exhibit an optical birefringence. There is extensive literature regarding metallic films for magnetic recording and $SiO_x$ (x=1, 2) films for liquid crystal alignment. Slocum has exploited oblique evaporation techniques to deposit anisotropic silver films on glass substrates to create infrared dichroic linear polarizers, as disclosed in the above-reference '907 patent, which is hereby incorporated by reference in its entirety, herein. It is also well known to those skilled in the art that plates deposited at an oblique incidence angle have a columnar structure with the columns oriented according to the plane of incidence. Even though the film material may itself by isotropic, the obliquely evaporated film is birefringent because of the anisotropic nature of the film morphology. That is, on a microscopic level, obliquely evaporated films are seen to be comprised of closely packed needles, or micro-ellipsoids. Thus the deposited film displays optical anisotropy between directions parallel and perpendicular to the long axes of the micro-needles.

Figure 12A:
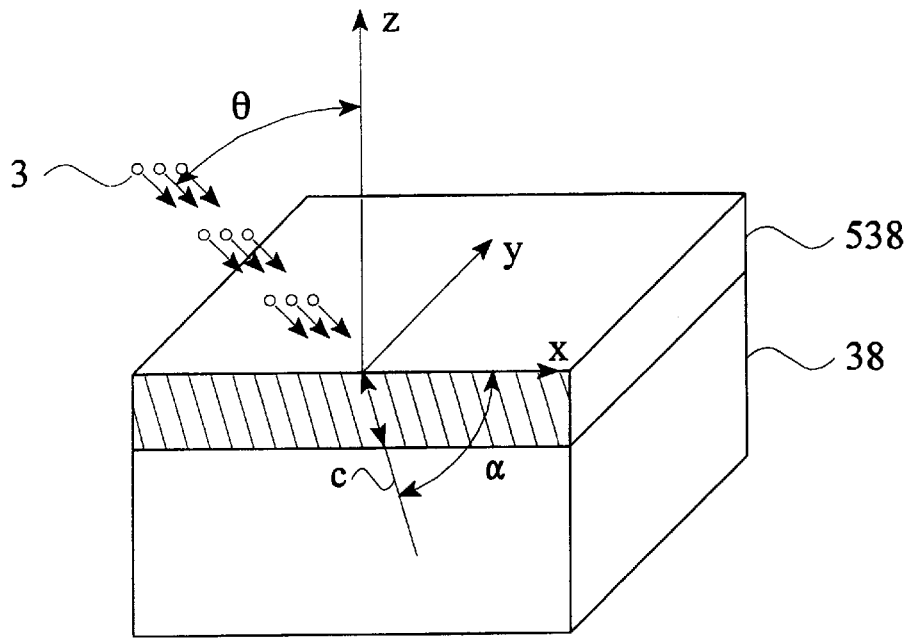
FIG. 12A is a schematic representation of a birefringent thin film during a step in the fabrication thereof.

With reference now to FIG. 12A, column or optic axis inclination angle α, of an obliquely vapor deposited film layer 538 is related to vapor deposition angle θ of evaporant vapor stream 3 by an empirical formula, $$\alpha = k\theta, \tag{4}$$

where k is a material dependent constant. Angle α is complementary to angle γ, ($\alpha = 90° - \gamma$) where γ is defined hereinabove, in connection with FIG. 8. For many deposited materials, this relationship may be described by the formula:

$$\tan\alpha = \tfrac{1}{2}\tan\theta \tag{4a}$$

Angle α may be any angle within the range of from 0° up to approximately 89°.

In theory, films with α=0° have the largest birefringence, while films with an angle α of 90° having no birefringence. However, experimental results (FIG. 12B) have shown that the largest birefringence (Δn) is generally obtained by depositing film at an angle of approximately 65° to obtain an angle α of approximately 45°.

Such films are optically biaxial; however, for normally incident light (light incident along the z-axis as shown), the film appears uniaxial. For example, as shown, optic axis c is in the xz-plane with an inclination angle α relative to the xy-plane. Since x-polarized light has an electric field oscillating in the ±x-axis direction, the light experiences no difference with respect to whether angle α is positive or negative (+α or −α). Likewise y-polarized light has an electric field oscillating in the ±y-axis direction, the light experiences no difference with respect to whether angle α is positive or negative (+α or −α). Film 538 thus has an average refractive index $n_{av}$ and birefringence Δn. By varying the deposition angle θ, the birefringence Δn can be engineered.

Figure 12B:
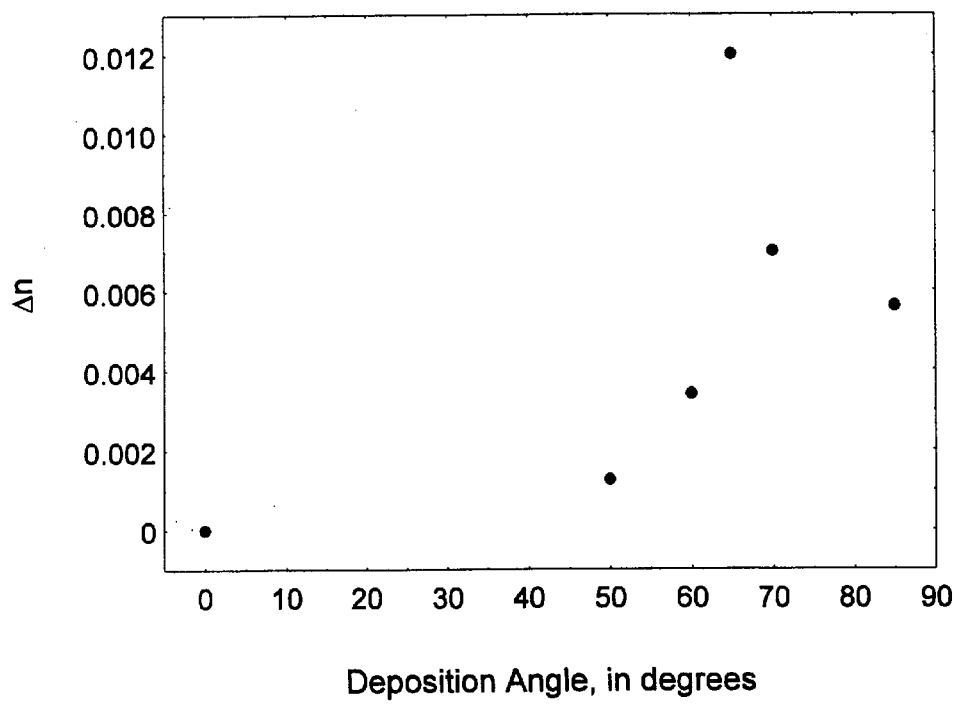
FIG. 12B is a graphical representation of levels of birefringence obtained experimentally by fabricating SiO films at different deposition angles in the manner shown in FIG. 12A.

Referring now to FIG. 12B, experimental results are shown for birefringence Δn vs deposition angle θ for SiO films. The birefringence Δn increases gradually with θ until it attains a maximum value of 0.012 at about 65° and decreases rapidly. As expected, films deposited at normal incidence do not exhibit any optical birefringence. Other obliquely deposited oxide films have been shown to exhibit a similar trend.

Suitable materials for oblique vapor deposition of the birefringent thin films of the present invention include lithium (Li), barium (Ba), yttrium (Y), titanium (Ti), zirconium (Zr), hafnium (Hf), vanadium (V), niobium (Nb), tantalum (Ta), molybdenum (Mo), tungsten (W), rhenium (Re), boron (B), silicon (Si), germanium (Ge), tin (Sn), lead (Pb), antimony (Sb), cerium (Ce) and bismuth (Bi) oxides. Metal fluorides such as $MgF_2$ and sulfides such as ZnS may also act as birefringent films using oblique deposition. It is expected that other materials, including organic compounds, may be obliquely deposited to form suitable birefringent films for use in the present invention.

Chiral film or a circular polarizer of the type described hereinabove with respect to polarizer 426, is obtained by progressively rotating the substrate in discrete steps during the deposition process, resulting in a chiral film that is a stack of multiple birefringent thin layers. As the deposition accumulates, the optic axis traces a helical pattern extending in the direction normal to the film (z-axis). The helical pitch P is a function of the vapor deposition rate relative to the rotation rate. The 'handedness' or chirality is set by the direction of the substrate rotation. The present invention thus includes rotation of the substrate is rotated in discrete steps during the deposition process, rather than continuously, resulting in a chiral film that is a stack of multiple birefringent thin layers. The advantage of the present deposition technique is that it allows sufficient time to form the birefringence-inducing columnar structure on a stationary substrate for each birefringent film layer.

Figure 13:
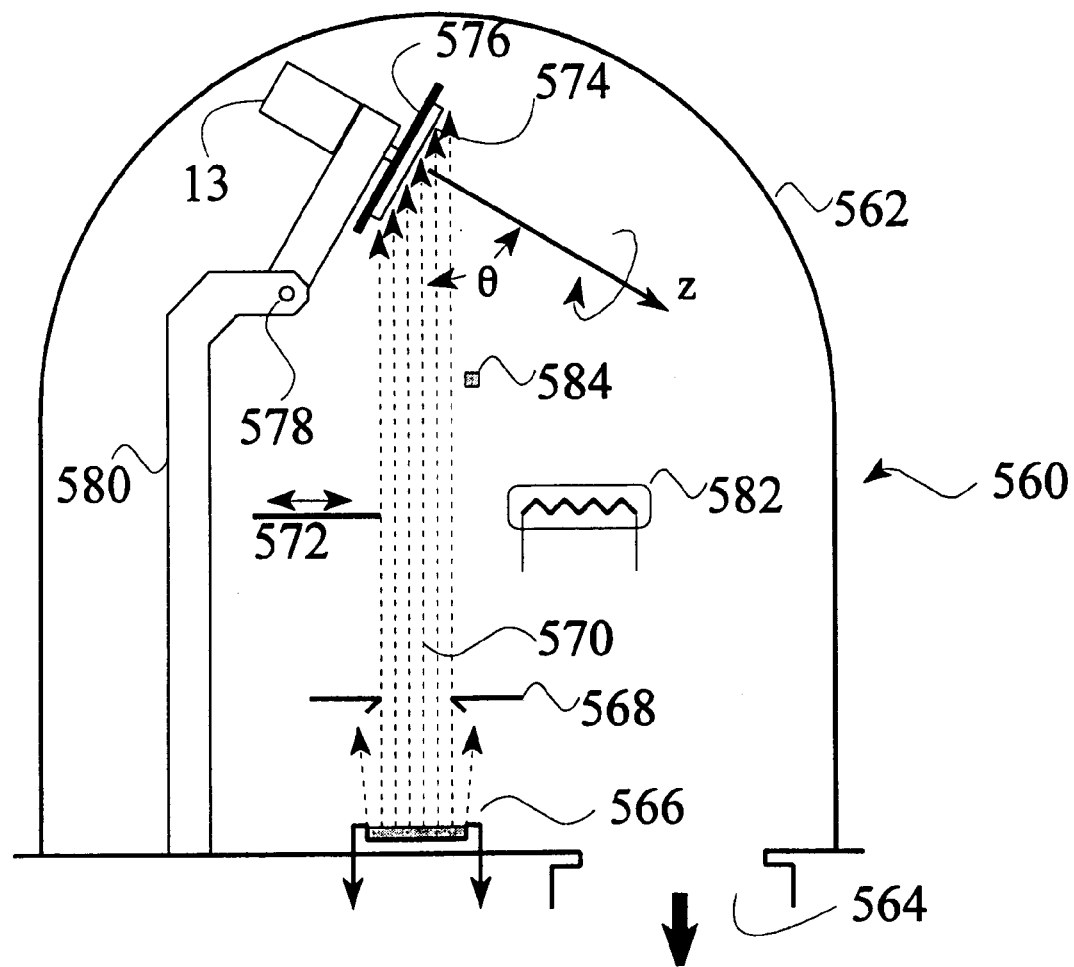
FIG. 13 is a schematic representation of a system suitable for fabricating the thin film as shown in FIG. 12A.

Referring now to FIG. 13, means for oblique deposition layers of the present invention is shown. A vacuum thin-film deposition system 560 suitable for oblique deposition, is a variation of a conventional vacuum vapor deposition system. A vacuum chamber 562, whose pressure is maintained by a vacuum pump system (not shown) is connected at outlet orifice 564. A conventional pump system including an oil-diffusion pump and a mechanical pump can maintain a pressure of $10^{-6}$ Torr in chamber 562. Other pump systems such as a molecular turbo pump or cryogenic pump, may also be used. Advantages and disadvantages of various vacuum pumps are well-known to those skilled in the art. An evaporant vapor stream source 566 is disposed inside the vacuum chamber, and a series of baffles 568 are provided to restrict divergence of the evaporant vapor beam 570. Several vapor sources may be employed. Typically, vapor stream source 566 contains an evaporant material to be deposited. The evaporant materials is heated by various means, such as electrical current, electron beam, pulsed laser irradiation and others to achieve a predetermined vapor pressure. Thermal evaporation, E-beam deposition and other techniques are well-known to those skilled in the art. A mechanical shutter 572 is preferably provided to gate vapor beam 570. Gating is achieved by mechanically blocking evaporant vapor beam 570 to prevent the beam from reaching substrate 574. The substrate is situated on a substrate holder 576. The substrate holder is pivotably attached by a coupling 578 to a post 580, to enable the substrate to be tilted at a desired angle θ with respect to the evaporant vapor stream. The substrate is preferably heated radiantly by a suitable lamp 582 (i.e. a tungsten-halogen lamp) to control substrate temperature. Alternatively, resistive heating can also be employed. A film thickness monitor 584 may be used to monitor the deposition rate. As shown, a stepper motor 586 is preferably employed to rotate the substrate with respect to the evaporant vapor stream for depositing film for a circular polarizer as described hereinabove.

This system may also be utilized for construction of a linear polarizer as described hereinabove. In this regard, substrate 574 will be tilted to ±θ with respect the vapor beam. For isotropic layers, the substrate is tilted and rotated rapidly to prevent columnar growth.

Figure 14:
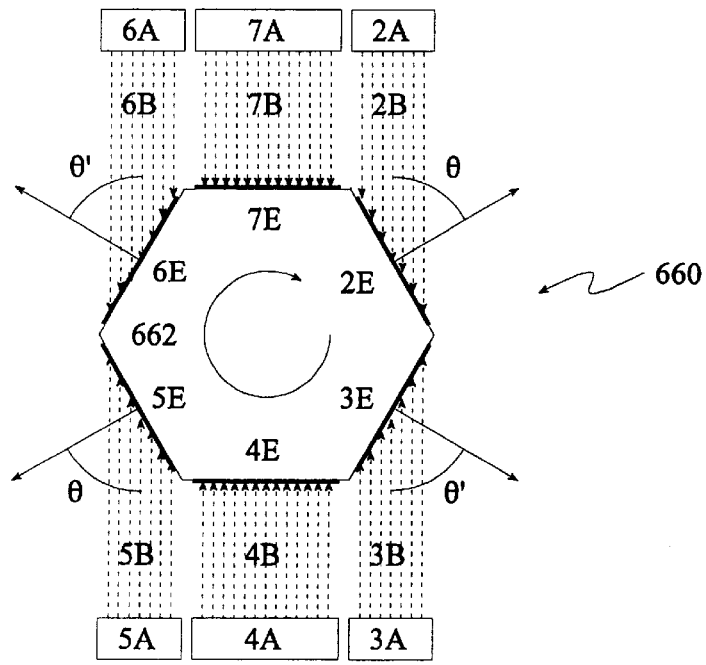
FIG. 14 is a schematic representation of a high throughput system suitable for fabricating the thin film as shown in FIG. 12A.

Referring now to FIG. 14, a vapor deposition system 660 suitable for fabrication of linear polarizer 126 (FIG. 3A) at a high throughput, is shown. System 660 has six deposition chambers, each having a substrate (2E, 3E, 4E, 5E, 6E, and 7E, respectively) and vapor source. For example, the substrate 2E is deposited for a thickness $t_1$ by vapor beam 2B emitted by the vapor source 2A of evaporant material A at an oblique angle of θ with normal to the substrate. For simplicity of the illustration, baffles, vapor beam shutter and others for the evaporant vapor beam 2B are not shown. After the desired film thickness is deposited, the substrate carrier 662 is rotated clockwise by 60°, so the substrate is deposited for a thickness $t_2$ by a vapor beam 3B emitted by a vapor source 3A, of material A at an oblique angle θ'=−θ. According to the technical teaching hereinabove, a birefringent layer of total thickness $t_A=t_1+t_2$, that consists of two sublayers is obtained. As discussed hereinabove, the sublayer structure reduces problems associated with growth in columnar diameter. After the birefringent layer is deposited, the substrate carrier is rotated clockwise by 60° again, so the substrate is deposited for a thickness $t_B$ by a vapor beam 4B emitted by a vapor source 4A at normal incidence to the substrate. The film thus deposited is optically isotropic. As the substrate carrier sequentially rotates clockwise by 60°, substrates 5E, 6E and 7E are similarly deposited with material A by vapor beams 5B, 6B and 7B emitted from vapor sources 5A, 6A and 7A respectively. A multilayer coating of periodic structure, consisting alternating of birefringent and isotropic thin layers, thus deposited on the substrate. Each birefringent layer consists of two sublayers deposited at +θ and −θ with respect to the normal to the film stack. It is clear that six substrates can be deposited simultaneously to achieve high throughput.

Figure 15:
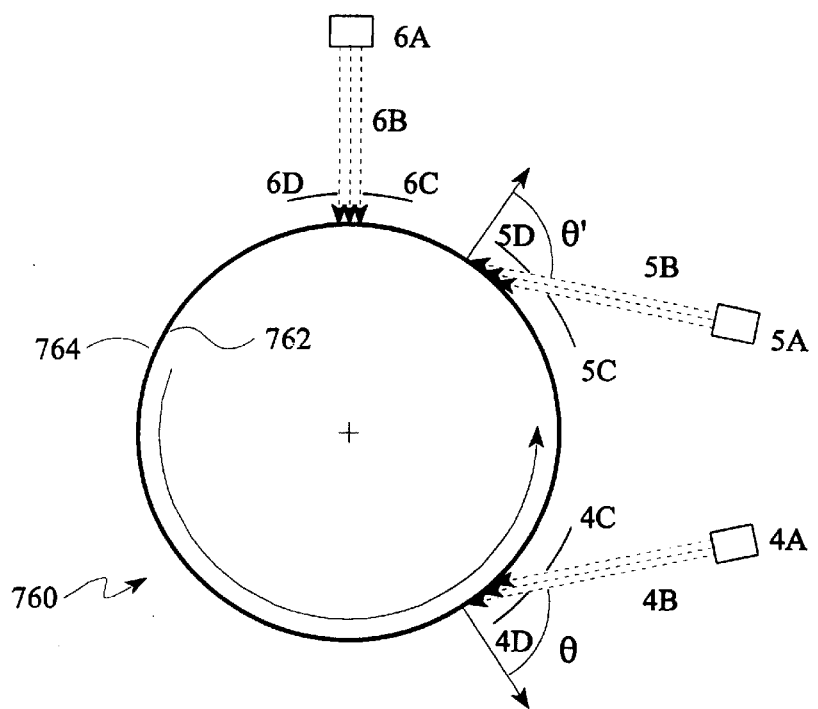
FIG. 15 is a schematic representation of a system suitable for continuous fabrication of the thin film as shown in FIG. 12A, on a flexible substrate.

Another vapor deposition system 760 suitable for continuous deposition of flexible substrate is shown schematically in FIG. 15. The vapor deposition system is suitable for high throughput. A cylindrical drum 762 with a relatively large diameter holds a flexible substrate 764. Polyester, Mylar, and/or polycarbonate thin films are suitable as a substrate. As the drum rotates counterclockwise, the substrate moves under various vapor sources, and a particular film layer is deposited, to result in a birefringent or isotropic layer, depending on the incidence angle of the evaporant vapor stream, normal to the substrate. For example, the substrate under vapor source 4A is deposited for a thickness $t_1$ with evaporant material A at an oblique angle of $\theta$ with normal to the substrate. As that portion of the substrate is moved under vapor source 5A, a thickness $t_2$ of the evaporant material A is deposited at an oblique angle of $\theta'=-\theta$ with normal to the substrate. Baffles similar to baffles 568 discussed hereinabove with respect to FIG. 13, are shown at 4C, 4D, 5C, 5D, 6C and 6D. According to the technical teaching hereinabove, a birefringent layer consisting of two sublayers is obtained. This layer has a total thickness $t_A=t_1+t_2$. As that portion of the substrate is moved under vapor source 6A, a thickness $t_B$ of the evaporant material B is deposited at normal incidence to the substrate. The film thus deposited is optically isotropic. As the substrate carrier rotates continuously, a multilayer coating of periodic structure, consisting alternating of birefringent and isotropic thin layers, are deposited on the substrate.

To utilize system 760 to deposit chiral films, such as, for example, polarizer 426 (FIG. 8A), the vapor sources are oblique at $\theta$ with the substrate normal. As the substrate is advanced from one source to next, the substrate is rotated by angle $\beta$ in the substrate plane to form a film stack according to the present invention.

Figure 16:
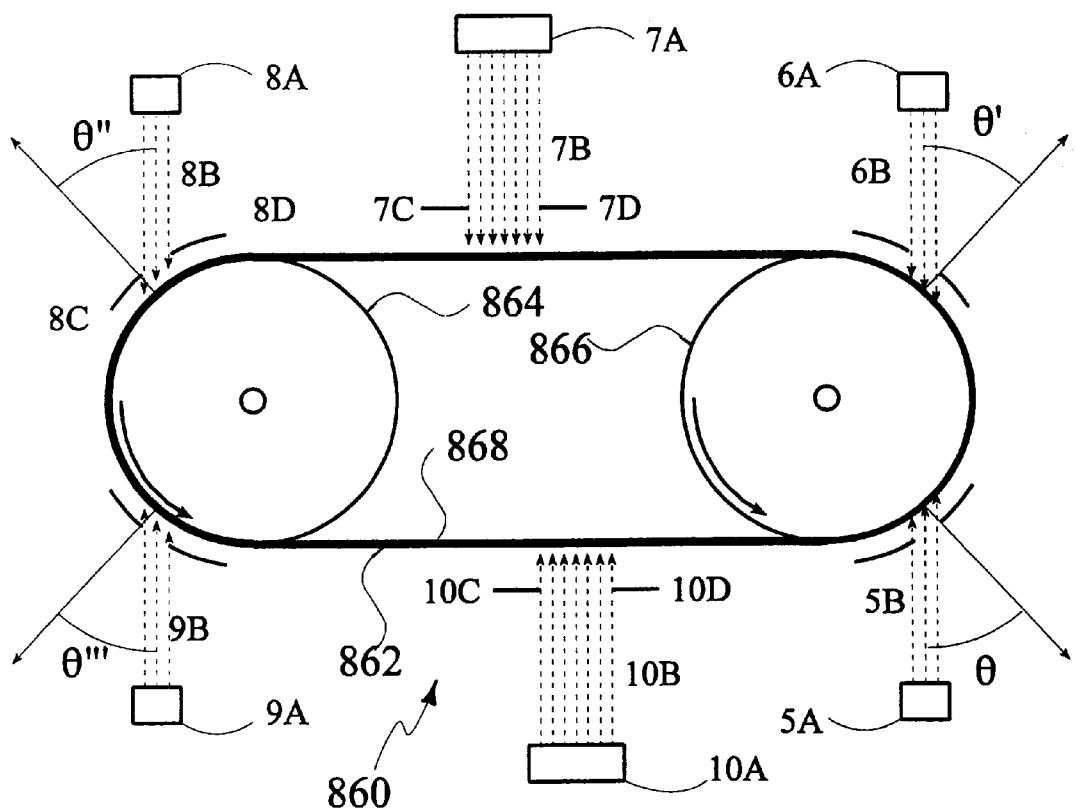
FIG. 16 is a schematic drawing of another system suitable for continuous fabrication of a thin film as shown in FIG. 12A, on flexible substrate.

A vapor deposition system 860 suitable for continuous deposition on flexible substrate is shown in FIG. 16. This vapor deposition system is also suitable for high throughput. A long flexible substrate 862 is attached on a conveyor comprising drum 864, drum 866 and belt 868. Polyester, myler, polycarbonate thin films are suitable as a substrate. As the substrate moves counterclockwise under various vapor sources, and a particular film layer is deposited, to result a birefringent or isotropic layer. For example, the substrate under vapor source 5A is deposited for a thickness $t_1$ with evaporant material A at an oblique angle of $\theta$ with normal to the substrate. As that portion of the substrate is transported under vapor source 6A, a thickness $t_2$ of the evaporant material A is deposited at an oblique of $\theta'=-\theta$ with normal to the substrate. Baffles similar to baffles 568 discussed hereinabove with respect to FIG. 13, may be utilized as shown, for example at 7C, 7D, 8C, 8D, 10C and 10D. According to the technical teaching above, a birefringent layer consisting of two sublayers is obtained. This layer has a total thickness $t_A=t_1+t_2$. At that portion of the substrate is transported under vapor source 7A, a thickness $t_B$ of the evaporant material B is deposited at normal incidence to the substrate. The film thus deposited is optically isotropic. As the substrate carrier rotates continuously, the substrate is similarly deposited with material by vapor beams 8B, 9B and 10B emitted from vapor sources 8A, 9A and 10A, respectively. A multilayer coating of periodic structure, consisting alternating of birefringent and isotropic thin layers, is thus deposited on the substrate.

Flexible substrates such as polyester, Mylar, polycarbonate thin films tend to exhibit residual birefringence, which has depolarizing effects, after light transmits through the polarizing film stack. Since the linearly polarizing film structures of the present invention operate by reflection, these polarizers may be utilized in a reflective mode wherein such small residual birefringence in the substrate has negligible effect.

Figure 17A:
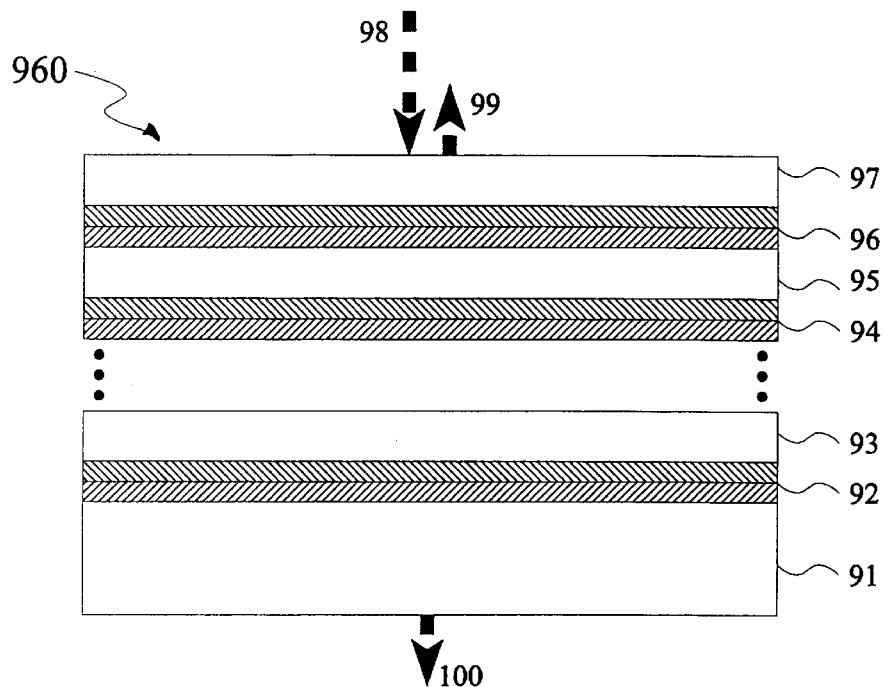
FIG. 17A is a diagrammatic representation of a polarizing device of the present invention, in a reflective mode, including light incident thereon.

As shown in FIG. 17A, a polarizing device 960 according to the present invention is utilized in reflective mode, i.e., reflected light is the light of interest. Device 960 is a multilayer thin-film structure, consisting of a stack of alternating birefringent and isotropic layers 92 to 97 deposited on a flexible substrate 91 which may have residual birefringence. Device 960 is placed so that the uppermost layer 97 faces incoming light 98. By virtue of polarization-selective reflectance, linearly polarized light 99 within the reflectance band of the device is reflected, while transmitted light 100 is partially depolarized because of the birefringence of the substrate. Since the polarizer is operated in its reflectance mode, the reflected light does not interact with the substrate at all, so it does not affect the polarization state of the reflected light. Similar effects pertain to circular polarizers disposed on a birefringent substrate.

Figure 17B:
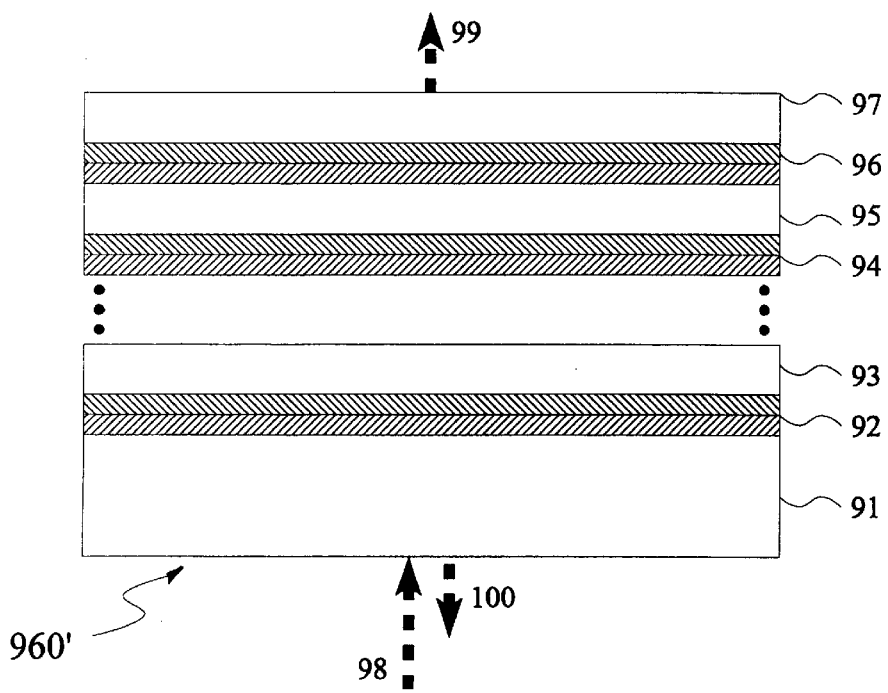
FIG. 17B is a diagrammatic representation of the polarizing device of FIG. 17A, in a transmittive mode, including light incident thereon.

Conversely, FIG. 17B shows the usage for the transmissive mode, i.e., transmitted light is of interest. In this configuration, device 960' is oriented with substrate 91 facing the incoming light 98. By virtue of polarization-selective reflectance, linearly polarized light 99 is transmitted, if the incident light has a spectral bandwidth within the reflective band of the polarizing device. Substrate 91 may exhibit birefringence. Thus, in its transmissive mode, the light is first transmitted through the substrate, where its polarization state may become 'perturbed.' The light then passes through the multilayer polarizing film stack where it is polarized linearly or circularly. This is preferred arrangement. On the other hand, if the light were passed through the film stack first and then through the substrate, the transmitted light emerging therefrom may not be 'purely' polarized linearly of circularly.

The embodiments of the present invention as described hereinabove thus serve to provide a non-absorbing, normal-incidence polarizer by means of nominally completely reflecting light polarized in one orientation of polarization. Advantageously, by reflecting, rather than absorbing this component of incident light, a polarizer of the present invention is able to withstand greater light intensities than prior art polarizers, without excessive heating. An additional benefit of utilizing reflection rather than absorption, is that the present invention may be fabricated from high temperature resistant inorganic materials, rather than optically absorptive organic materials. This aspect further increases the energy handling capability of the present invention, by enabling the polarizer to function at temperatures as high as approximately 200 degrees C or more.

The foregoing description is intended primarily for purposes of illustration. Although the invention has been shown and described with respect to an exemplary embodiment thereof, it should be understood by those skilled in the art that the foregoing and various other changes, omissions, and additions in the form and detail thereof may be made therein without departing from the spirit and scope of the invention.

Having thus described the invention, what is claimed is:

1. A light polarizer comprising:

a substrate;

a plurality of discrete layers of birefringent film disposed on said substrate in superposed relation to one another;

each of said plurality of discrete layers being substantially planar and defining a reference plane; each one of said plurality of discrete layers having an optic axis extending obliquely relative to said reference plane, said optic axis having a planar component thereof extending parallel to said reference plane;

said planar component of at least one of said plurality of discrete layers being angularly offset from said planar component of an other of said plurality of discrete layers.

2. The light polarizer as set forth in claim 1, wherein said planar component of each one of said plurality of discrete layers is angularly offset from each adjacent one of said plurality of discrete layers.

3. The light polarizer as set forth in claim 2, wherein said planar component of each successive one of said plurality of discrete layers is angularly offset relative each preceding one of said plurality of discrete layers, by an oblique, acute angle in one of a positive and negative direction to provide said light polarizer with a chirality being one of right-handed and left-handed for circularly polarizing light incident thereon.

4. The light polarizer as set forth in claim 3, wherein said oblique, acute angle is constant for each successive one of said plurality of discrete layers.

5. The light polarizer as set forth in claim 3, further comprising a pitch $P_0 = \lambda_0/n_{av}$, where $\lambda_0$ is a characteristic wavelength of said light polarizer and $n_{av}$ is an average index of refraction of said light polarizer.

6. The light polarizer as set forth in claim 5, wherein said pitch comprises a predetermined number J of said plurality of discrete layers, of substantially equal thickness t.

7. The light polarizer as set forth in claim 6, wherein said thickness $t = P_0/J$ and said predetermined number J is an integer.

8. The light polarizer as set forth in claim 6, wherein said predetermined number J is a non-integer.

9. The light polarizer as set forth in claim 3, wherein said plurality of discrete layers further comprises a plurality of portions indexable as j=1, 2, ..., N, disposed in superposed orientation with one another;
   each of said plurality of portions including a predetermined number of the plurality of discrete layers, and having a chirality being one of right-handed and left-handed;
   each of said plurality of portions having a pitch $P_j = \lambda_j/n_{avj}$, where $\lambda_j$ is a characteristic wavelength, and $n_{avj}$ is the average index of refraction, respectively, of each of the plurality of portions j.

10. The light polarizer as set forth in claim 9, wherein said plurality of portions further comprises a first portion j=1 and a second portion j=2, said chirality of said first portion being opposite to said chirality of said second portion.

11. The light polarizer as set forth in claim 10, wherein:
   said first portion has a first pitch $P_1$ and said second portion has a second pitch $P_2$, said first pitch $P_1$ and said second pitch $P_2$ being substantially constant throughout said first portion and said second portion, respectively; and
   said first pitch $P_1$ and said second pitch $P_2$ being substantially equal to one another, wherein said light polarizer reflects substantially 100% of incident light having a predetermined spectral band.

12. The light polarizer as set forth in claim 9, wherein said plurality of portions further comprises a first portion j=1 and a second portion j=2, said chirality of said first portion being substantially identical to said chirality of said second portion.

13. The light polarizer as set forth in claim 9, wherein:
   said pitch of each one of said plurality of portions is constant therethrough;
   at least one of said plurality of portions having a pitch distinct from that of at least one other of said plurality of portions;
   said plurality of portions all being of identical chirality.

14. The light polarizer as set forth in claim 9, wherein said pitch of each of said plurality of portions is constant therethrough;
   at least one of said plurality of portions having a pitch distinct from at least one other of said plurality of portions;
   said plurality of portions including portions having opposite chiralities to one another.

15. The light polarizer as set forth in claim 3, further comprising a pitch, said pitch being variable along a direction orthogonal to said reference plane.

16. The light polarizer as set forth in claim 15, wherein said pitch is varied by selectively varying said oblique, acute angle of successive ones of said plurality of discrete layers.

17. The light polarizer as set forth in claim 16, wherein said pitch is varied by providing selected ones of said discrete layers with dissimilar thickness t.

18. The light polarizer as set forth in claim 15, wherein said pitch is varied by providing selected ones of said discrete layers with dissimilar thicknesses t.

19. The light polarizer as set forth in claim 15, wherein said plurality of discrete layers further comprise a plurality of portions disposed in superposed orientation with one another;
   each of said plurality of portions including a predetermined number of said plurality of discrete layers, and having a chirality being one of right-handed and left-handed.

20. The light polarizer as set forth in claim 19, wherein said plurality of portions further comprise a first portion and a second portion, said chirality of said first portion being opposite to said chirality of said second portion.

21. The light polarizer as set forth in claim 19, wherein said plurality of portions are all of the same chirality.

22. The light polarizer as set forth in claim 3, further comprising a quarter-wave layer of birefringent film superimposed thereon, said quarter-wave layer being substantially planar and having a thickness $t = \lambda_0/4$, where $\lambda_0$ is a characteristic wavelength of said light polarizer, wherein said quarter-wave layer converts light incident thereon from circularly polarized to linearly polarized.

23. The light polarizer as set forth in claim 2, wherein said planar component of each successive one of said plurality of layers is orthogonally offset relative each preceding one of said plurality of layers.

24. The light polarizer as set forth in claim 23, wherein said plurality of discrete layers further comprises at least two portions indexable as j=1, 2, ... N, disposed in superposed orientation with one another;
   each of said at least two portions including a predetermined number of said plurality of discrete layers;
   each of said at least two portions having a characteristic wavelength $\lambda_j$; and
   at least two of said characteristic wavelength $\lambda_1$ and $\lambda_2$ being distinct from one another wherein polarizing bandwidth of said light polarizer is relatively increased.

25. The light polarizer as set forth in claim 24, wherein each one of said predetermined number of said plurality of discrete layers further comprises a quarter-wave layer, having a thickness $t = \lambda_j/4$.

26. The light polarizer as set forth in claim 25, wherein said plurality of discrete layers further comprises at least one intermediate layer disposed between said at least two portions, said at least one intermediate layer having a thickness between $\lambda_1/4$ and $\lambda_2/4$ so that said light polarizer varies gradually from said characteristic wavelength $\lambda_1$ to said characteristic wavelength $\lambda_2$.

27. The light polarizer as set forth in claim 23, wherein each one of said plurality of layers further comprises a quarter-wave layer, having a thickness $t=\lambda_0/4$, where $\lambda_0$ is a characteristic wavelength of said light polarizer.

28. The light polarizer as set forth in claim 23, wherein at least one of said quarter-wave layers further comprises a composite layer having a plurality of discrete superimposed sublayers;

each one of said plurality of discrete superimposed sublayers being substantially planar and extending in said reference plane;

each one of said plurality of superimposed sublayers having a sublayer optic axis and a sublayer planar component thereof;

said sublayer planar components of each one of said plurality of superimposed sublayers extending in said reference plane parallel to one other, to define said planar component of said composite layer.

29. The light polarizer as set forth in claim 28, further comprising a plurality of said composite layers.

30. The light polarizer as set forth in claim 29, wherein each one of said plurality of discrete layers comprise one of said composite layers.

31. The light polarizer as set forth in claim 1, wherein said substrate is transparent in a desired wavelength region of light.

32. The light polarizer as set forth in claim 1, wherein each one of said plurality of discrete layers are fabricated from an inorganic material.

33. The light polarizer of claim 32, wherein each one of said plurality of discrete layers is fabricated from a material selected from the group consisting of lithium (Li), barium (Ba), yttrium (Y), titanium (Ti), zirconium (Zr), hafnium (Hf), vanadium (V), niobium (Nb), tantalum (Ta), molybdenum (Mo), tungsten (W), rhenium (Re), boron (B), silicon (Si), germanium (Ge), tin (Sn), lead (Pb), antimony (Sb), cerium (Ce), bismuth (Bi) oxides, lithium fluoride (LiF), calcium fluoride ($CaF_2$), magnesium fluoride ($MgF_2$) and zinc sulfide (ZnS).

34. The light polarizer as set forth in claim 1, wherein at least one of said plurality of discrete layers is fabricated by depositing material at an oblique deposition angle.

35. A light polarizer comprising:

a substrate;

a plurality of discrete layers of birefringent film disposed on said substrate in superposed relation to one another;

each of said plurality of discrete layers being substantially planar and defining a reference plane;

each one of said plurality of discrete layers having an optic axis, said optic axis having a planar component thereof extending parallel to said reference plane;

said planar component of each successive one of said plurality of discrete layers being angularly offset relative to said planar component of said preceding one of said plurality of discrete layers by an oblique, acute angle in one of a positive and negative direction to provide said light polarizer with a chirality being one of right-handed and left-handed for circularly polarizing light incident thereon; and having a pitch $P_0=\lambda_0/n_{av}$, where $\lambda_0$ is a characteristic wavelength of said light polarizer and $n_{av}$ is an average index of refraction of said light polarizer.

* * * * *